United States Patent
Gotlib Vainshtein et al.

(10) Patent No.: US 10,003,060 B1
(45) Date of Patent: Jun. 19, 2018

(54) SURFACE ACTIVATION IN ELECTRODE STACK PRODUCTION AND ELECTRODE-PREPARATION SYSTEMS AND METHODS

(71) Applicant: STOREDOT LTD., Herzeliya (IL)

(72) Inventors: Ekaterina Gotlib Vainshtein, Petah Tikva (IL); Daniel Aronov, Netanya (IL)

(73) Assignee: StoreDot Ltd., Herzeliya (IL)

( * ) Notice: Subject to any disclaimer, the term of this patent is extended or adjusted under 35 U.S.C. 154(b) by 0 days. days.

(21) Appl. No.: 15/846,246

(22) Filed: Dec. 19, 2017

Related U.S. Application Data

(63) Continuation-in-part of application No. 15/431,793, filed on Feb. 14, 2017.
(Continued)

(51) Int. Cl.
| | |
|---|---|
| *H01M 2/16* | (2006.01) |
| *H01M 10/0525* | (2010.01) |
| *H01M 10/04* | (2006.01) |
| *H01M 4/04* | (2006.01) |
| *H01M 2/02* | (2006.01) |
| *H01M 10/0585* | (2010.01) |

(52) U.S. Cl.
CPC ........ *H01M 2/1673* (2013.01); *H01M 2/0275* (2013.01); *H01M 4/0402* (2013.01); *H01M 4/0435* (2013.01); *H01M 10/0404* (2013.01); *H01M 10/0468* (2013.01); *H01M 10/0525* (2013.01); *H01M 10/0585* (2013.01)

(58) Field of Classification Search
None
See application file for complete search history.

(56) References Cited

U.S. PATENT DOCUMENTS

| | | | |
|---|---|---|---|
| 2002/0007552 | A1 | 1/2002 | Singleton et al. |
| 2002/0050054 | A1 | 5/2002 | Noh |
| | | | (Continued) |

OTHER PUBLICATIONS

Arora et al. "Battery Separators", Chemical Reviews Mar. 30, 2004, vol. 104, pp. 4419-4462.
(Continued)

*Primary Examiner* — Alix E Eggerding
(74) *Attorney, Agent, or Firm* — Pearl Cohen Zedek Latzer Baratz LLP

(57) ABSTRACT

Methods, stacks and electrochemical cells are provided, in which the cell separator is surface-treated prior to attachment to the electrode(s) to form binding sites on the cell separator and enhance binding thereof to the electrode(s), e.g., electrostatically. The cell separator(s) may be attached to the electrode(s) by cold press lamination, wherein the created binding sites are configured to stabilize the cold press lamination electrostatically—forming flexible and durable electrode stacks. Electrode slurry may be deposited on a sacrificial film and then attached to current collector films, avoiding unwanted interactions between materials and in particular solvents involved in the respective slurries. Dried electrode slurry layers may be pressed or calendared against each other to yield thinner, smother and more controllably porous electrodes, as well as higher throughput. The produced stacks may be used in electrochemical cells and in any other type of energy storage device.

26 Claims, 24 Drawing Sheets

Related U.S. Application Data

(60) Provisional application No. 62/537,535, filed on Jul. 27, 2017, provisional application No. 62/435,865, filed on Dec. 19, 2016.

(56) References Cited

U.S. PATENT DOCUMENTS

| | | |
|---|---|---|
| 2003/0027051 A1 | 2/2003 | Kejha et al. |
| 2010/0058585 A1 | 3/2010 | Remizov et al. |
| 2010/0075225 A1 | 3/2010 | Wilkins et al. |
| 2011/0176255 A1 | 7/2011 | Sasaki et al. |
| 2015/0069109 A1* | 3/2015 | Mori ................ B32B 37/18 228/18 |
| 2016/0380250 A1* | 12/2016 | Umeyama ......... H01M 2/1653 429/145 |

OTHER PUBLICATIONS

Zhang "A review on the separators of liquid electrolyte Li-ion batteries", Journal of Power Sources, Nov. 22, 2006, vol. 164, pp. 351-364.

Office Action for U.S. Appl. No. 15/431,793. dated Jun. 23, 2017.

Final Office Action for U.S. Appl. No. 15/431,793. dated Sep. 14, 2017.

Notice of Allowance for U.S. Appl. No. 15/431,793. dated Oct. 26, 2017.

\* cited by examiner

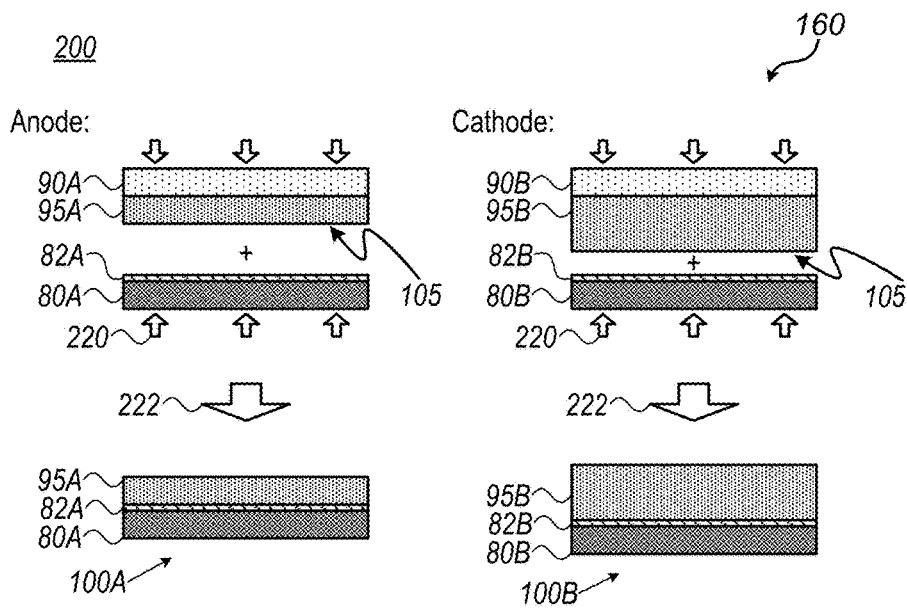
Figure 3A
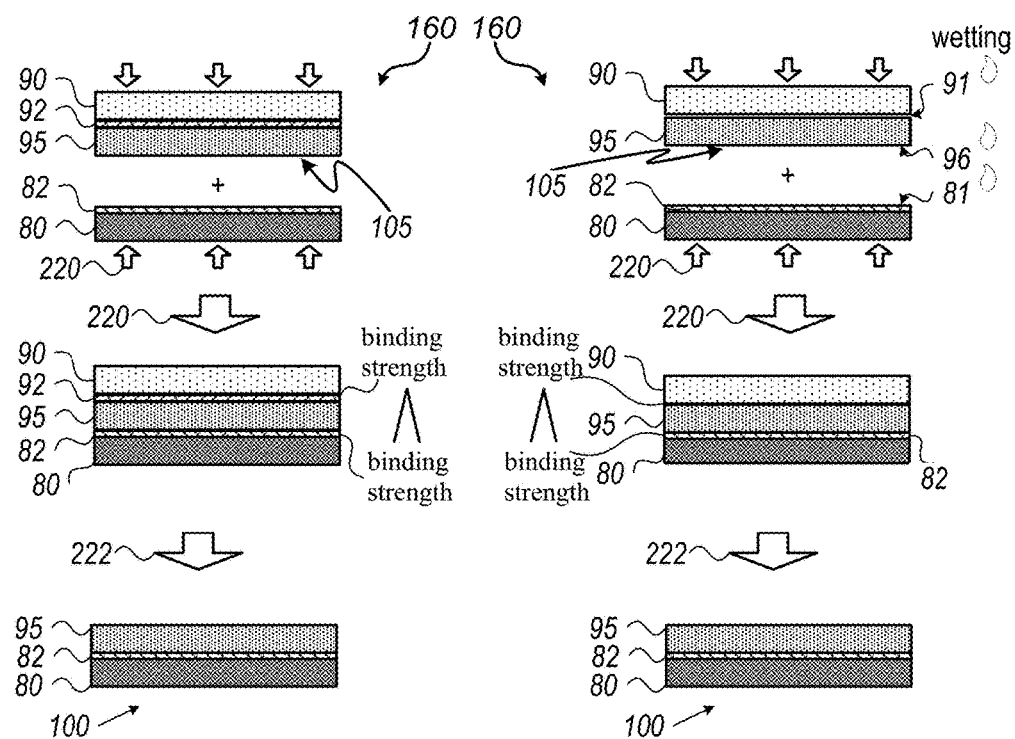
Figure 3B                    Figure 3C

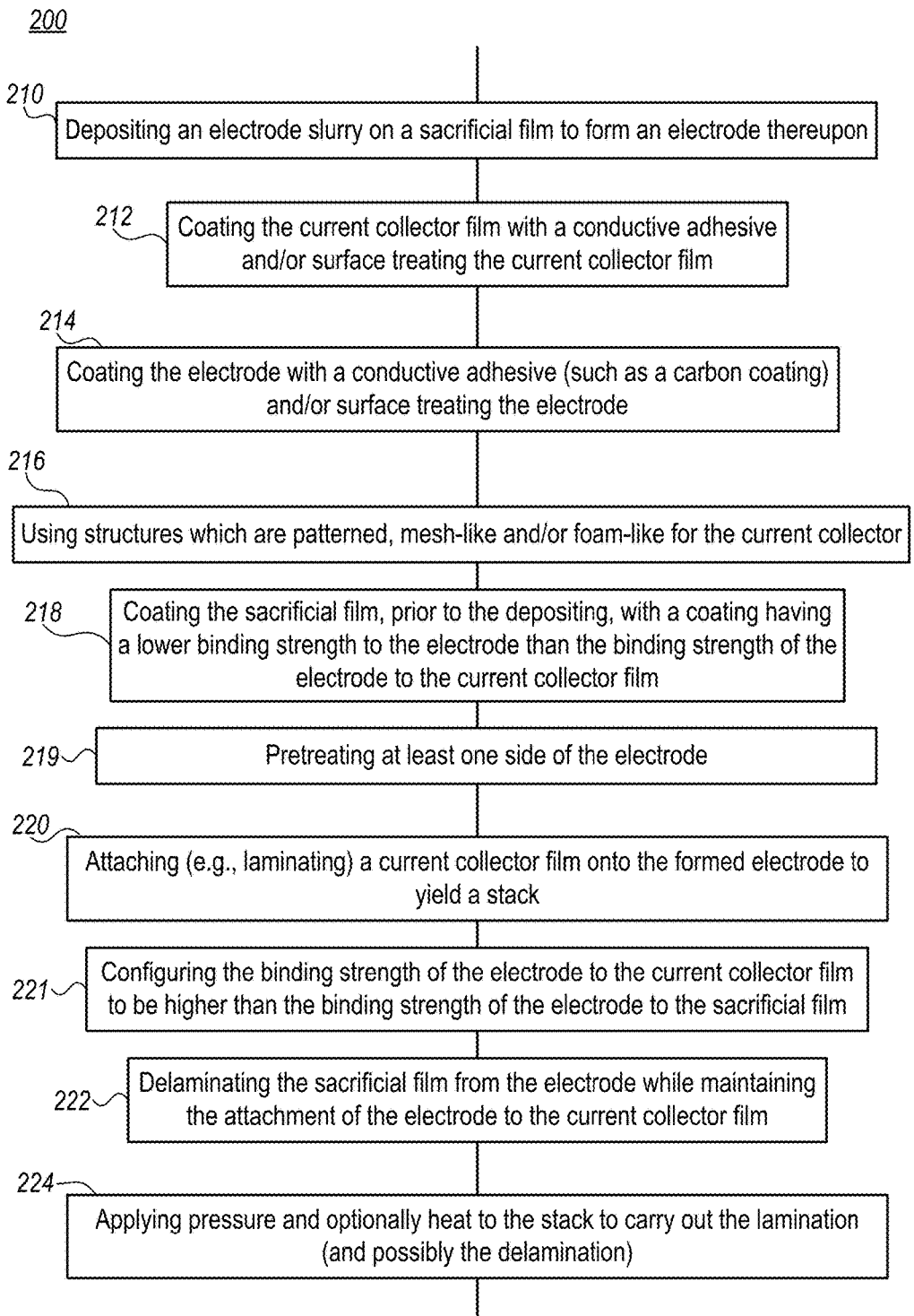
Figure 7 (Continued, 1.)

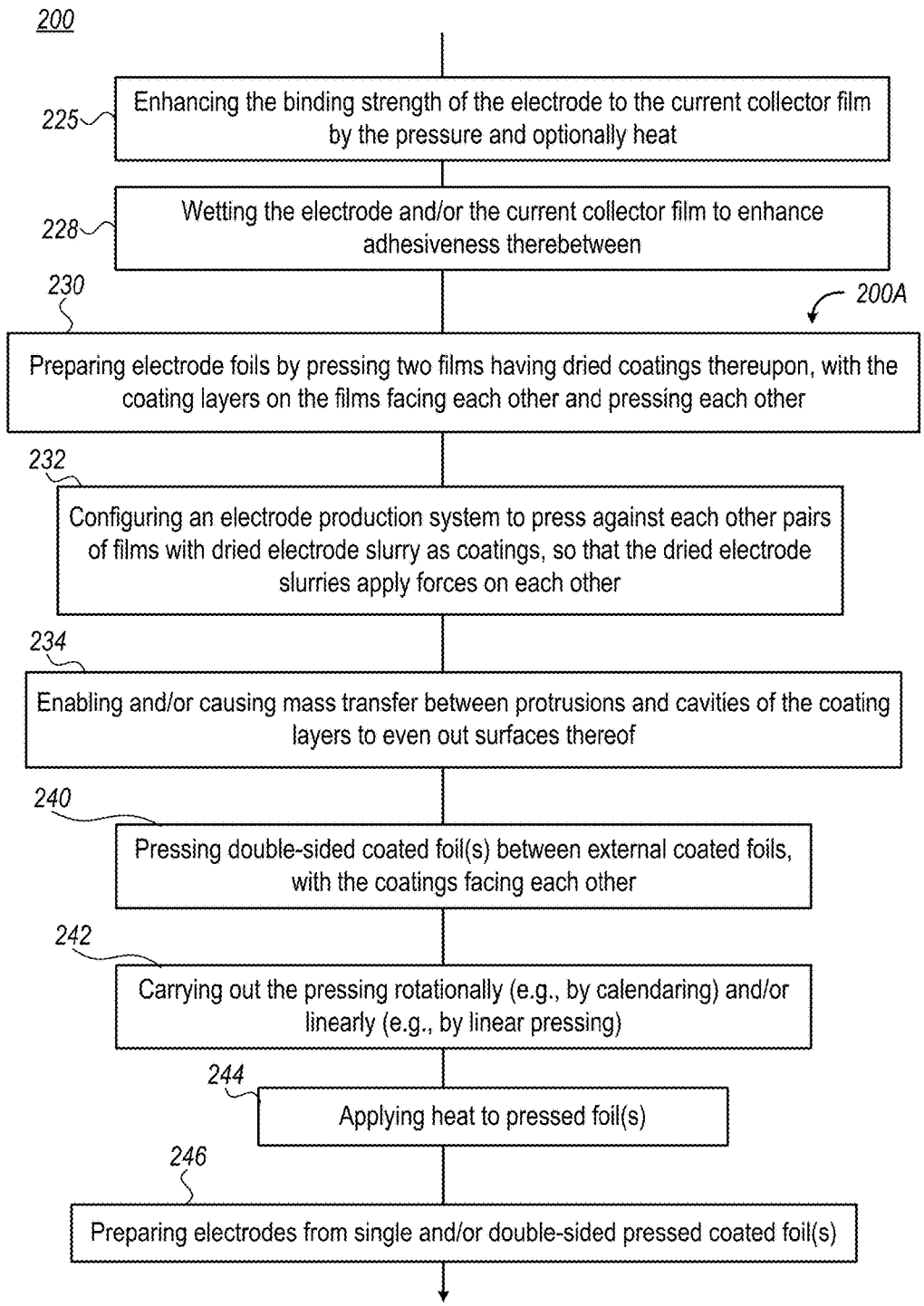
Figure 7 (Continued, 2.)

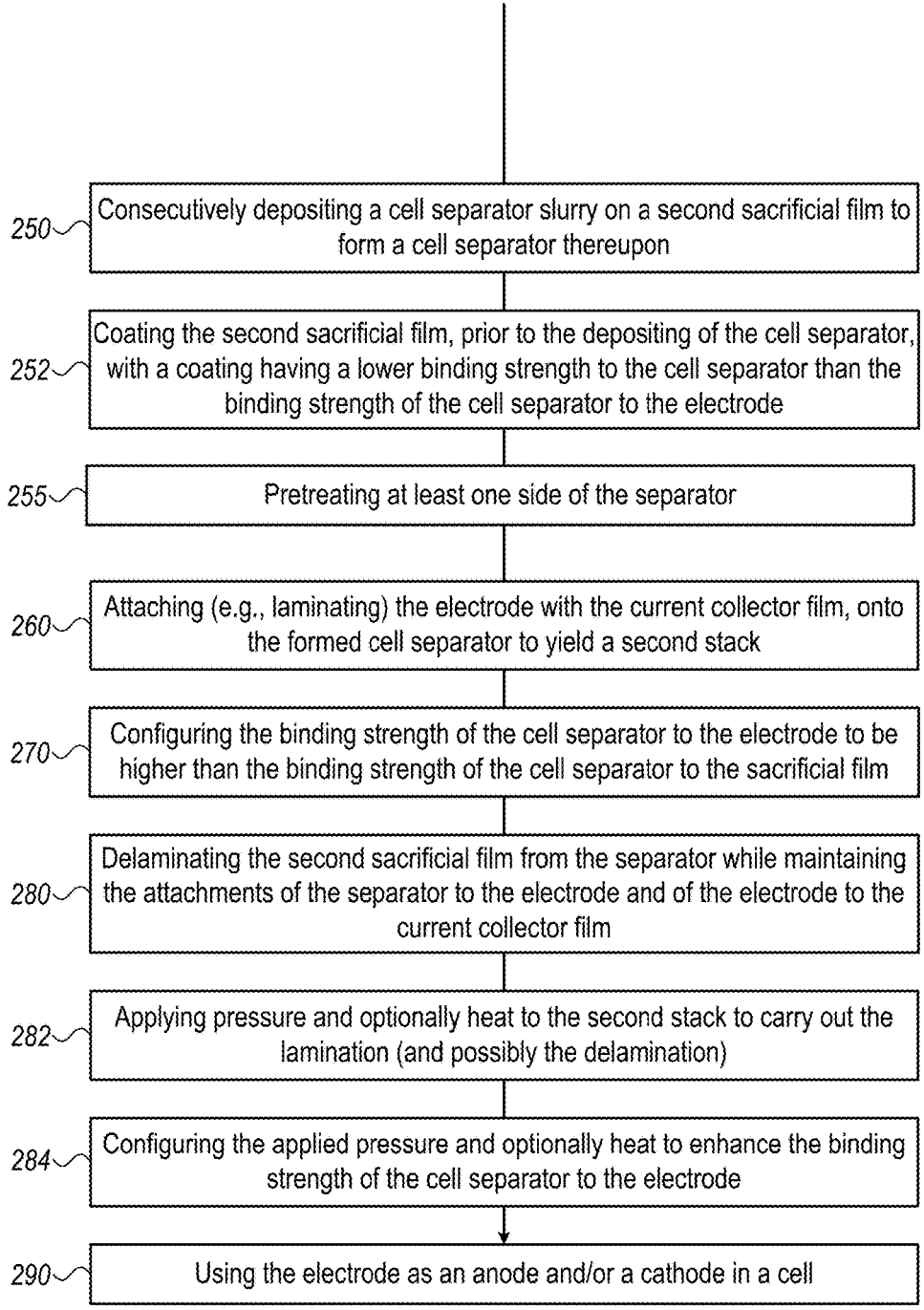
Figure 7 (Continued, 3.)

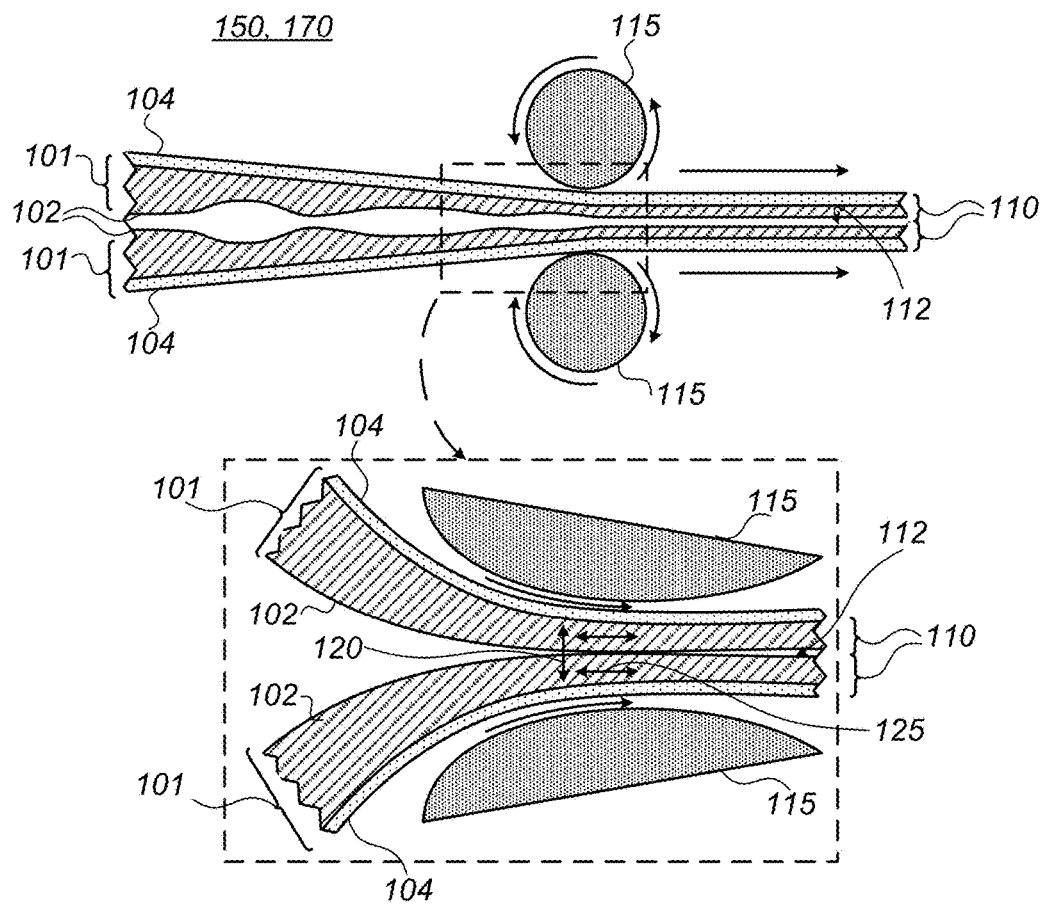
Figure 8
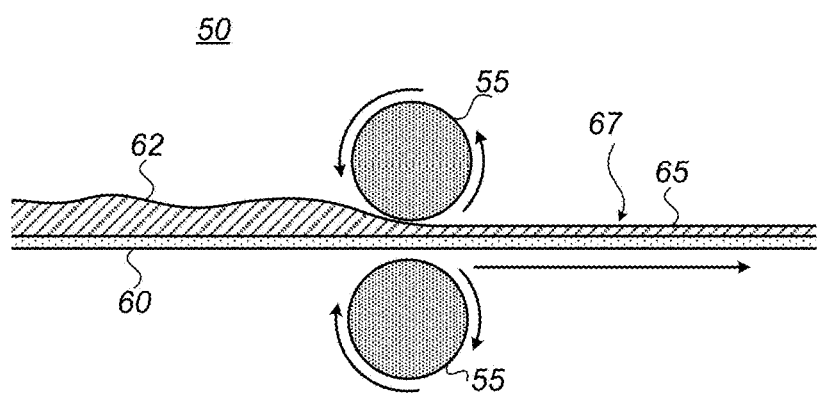
Figure 9 – Prior Art

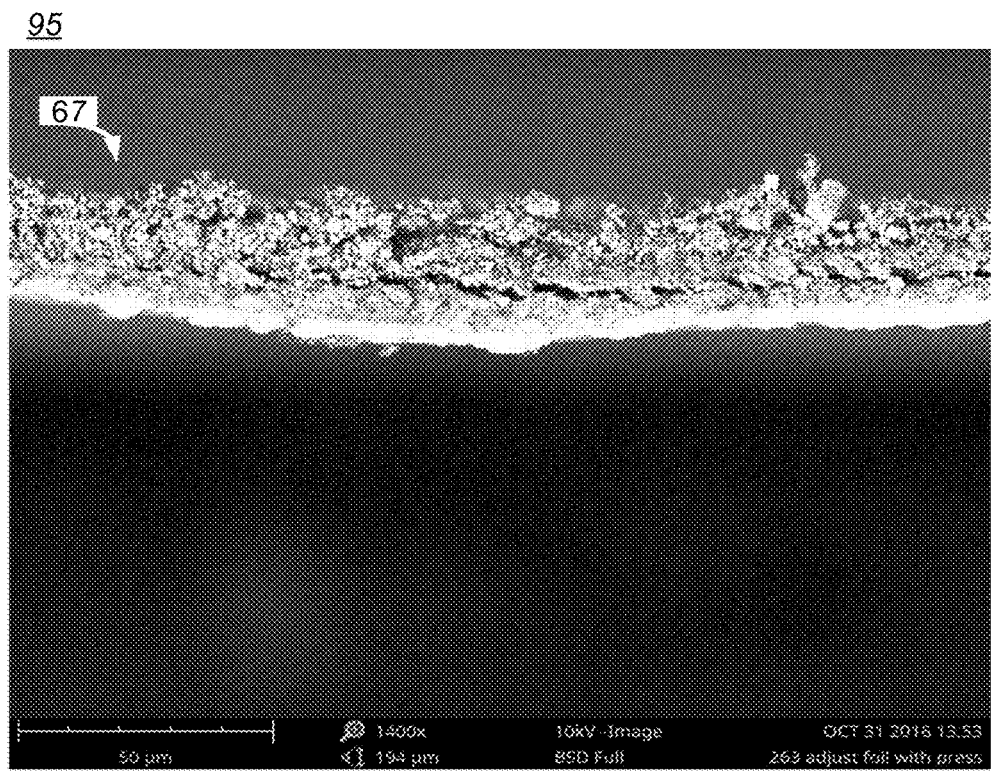
*Figure 17A – Prior art*
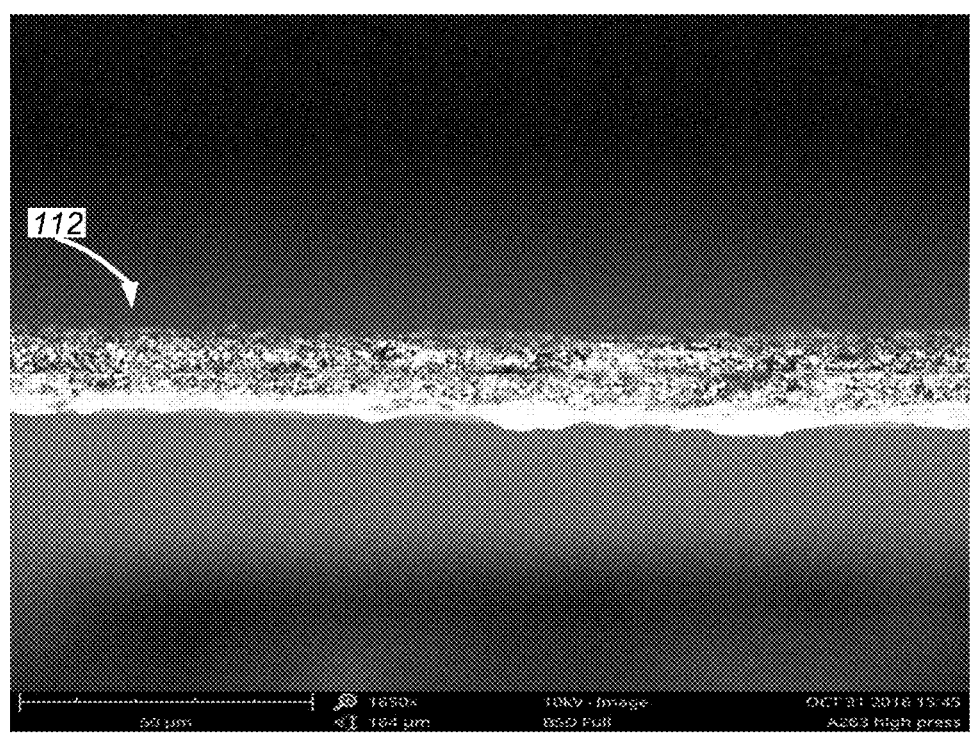
*Figure 17B*

65
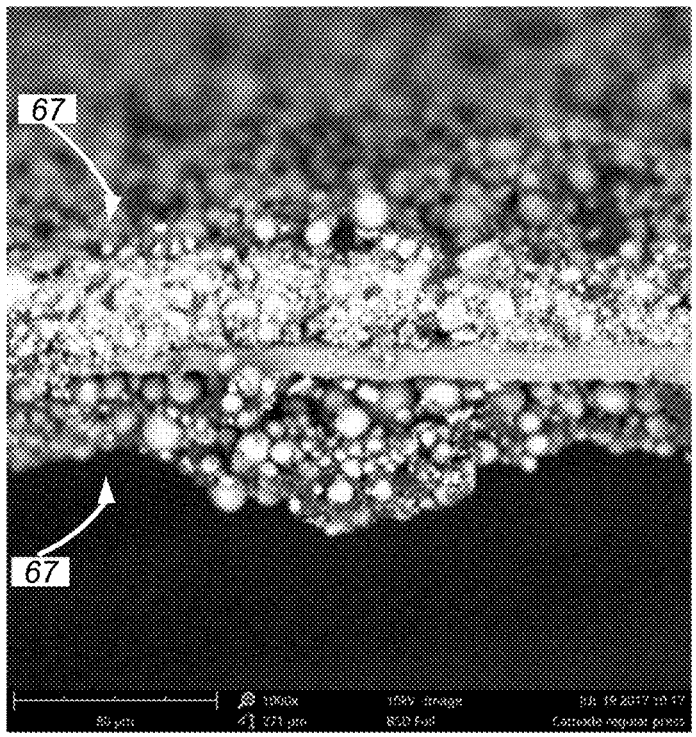
Figure 18A – Prior art
110
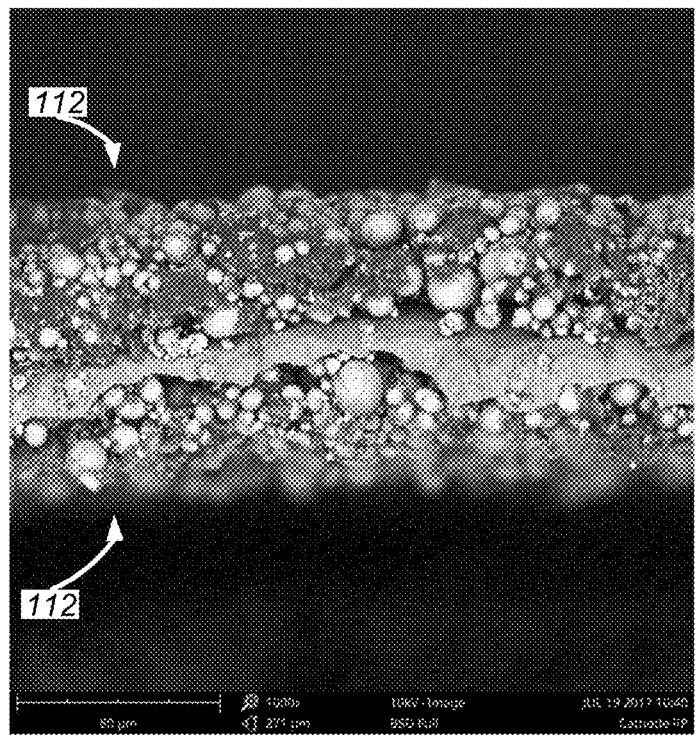
Figure 18B

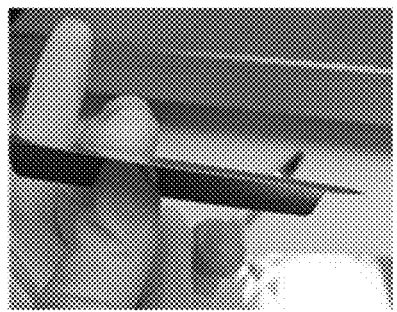
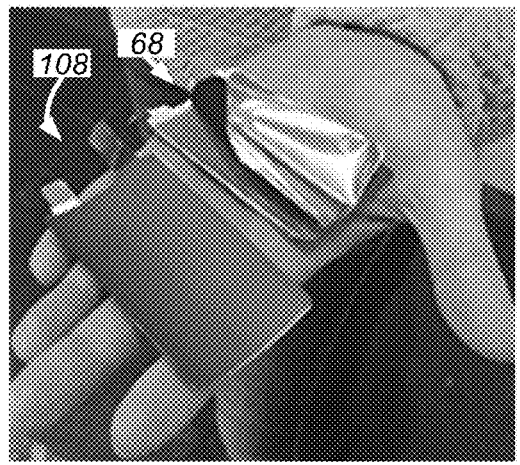
Figure 19A          Figure 19B
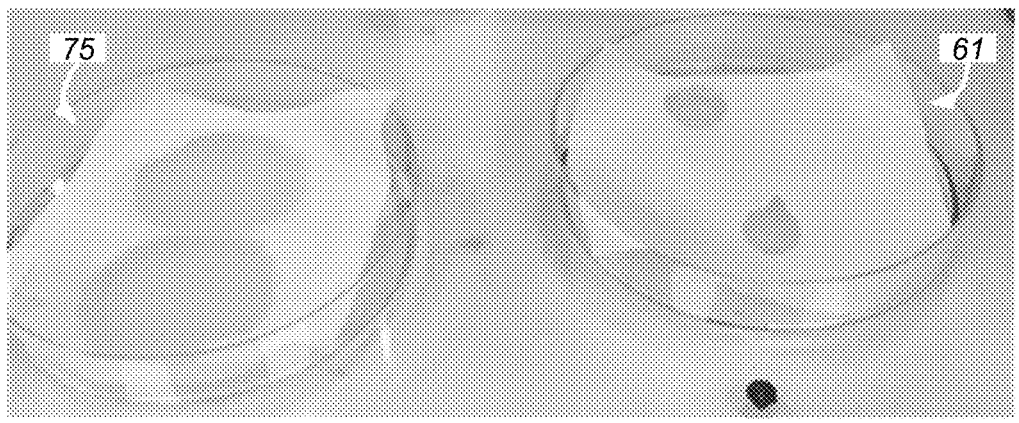
Figure 19C
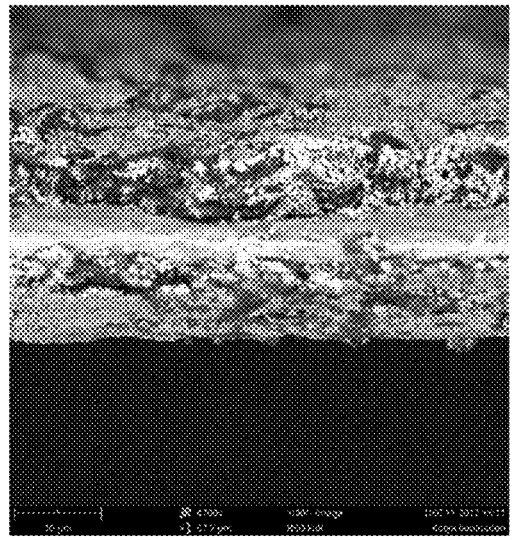
Figure 19D
– Prior art

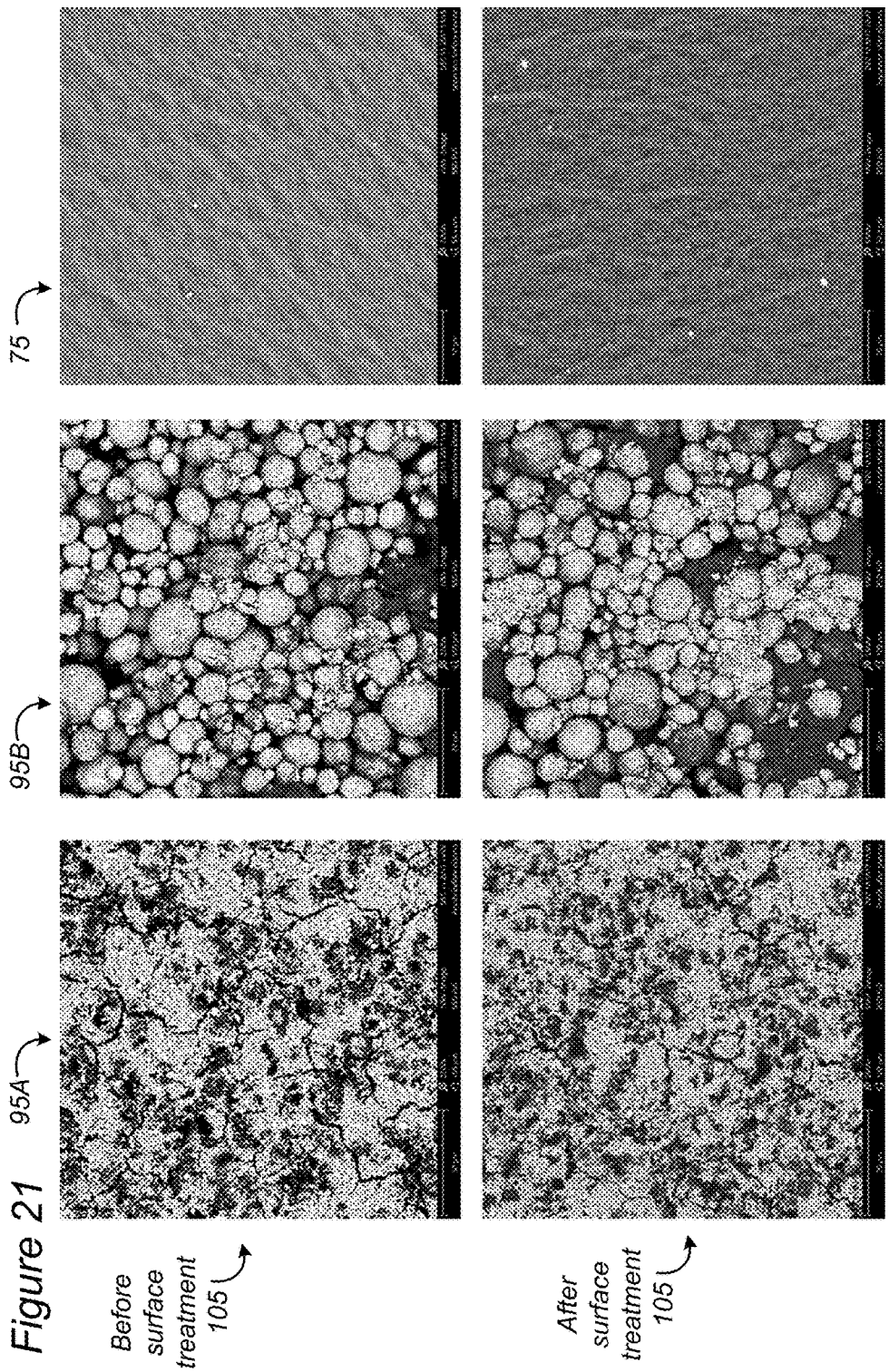

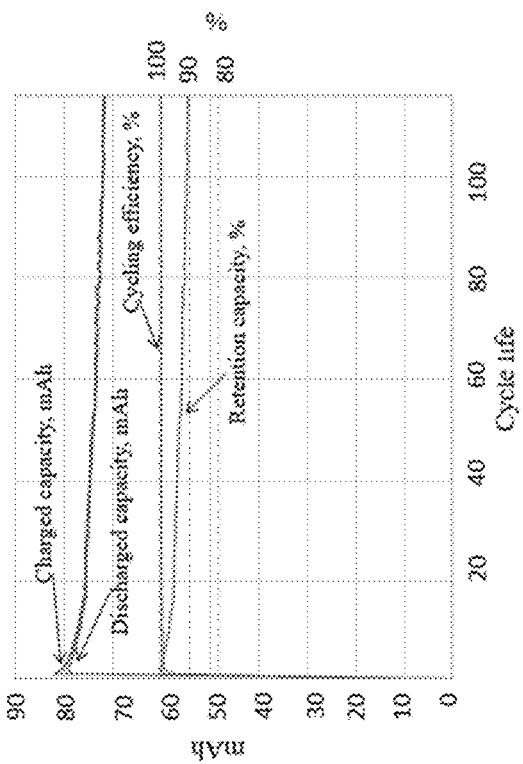
*Figure 22B – Prior art*
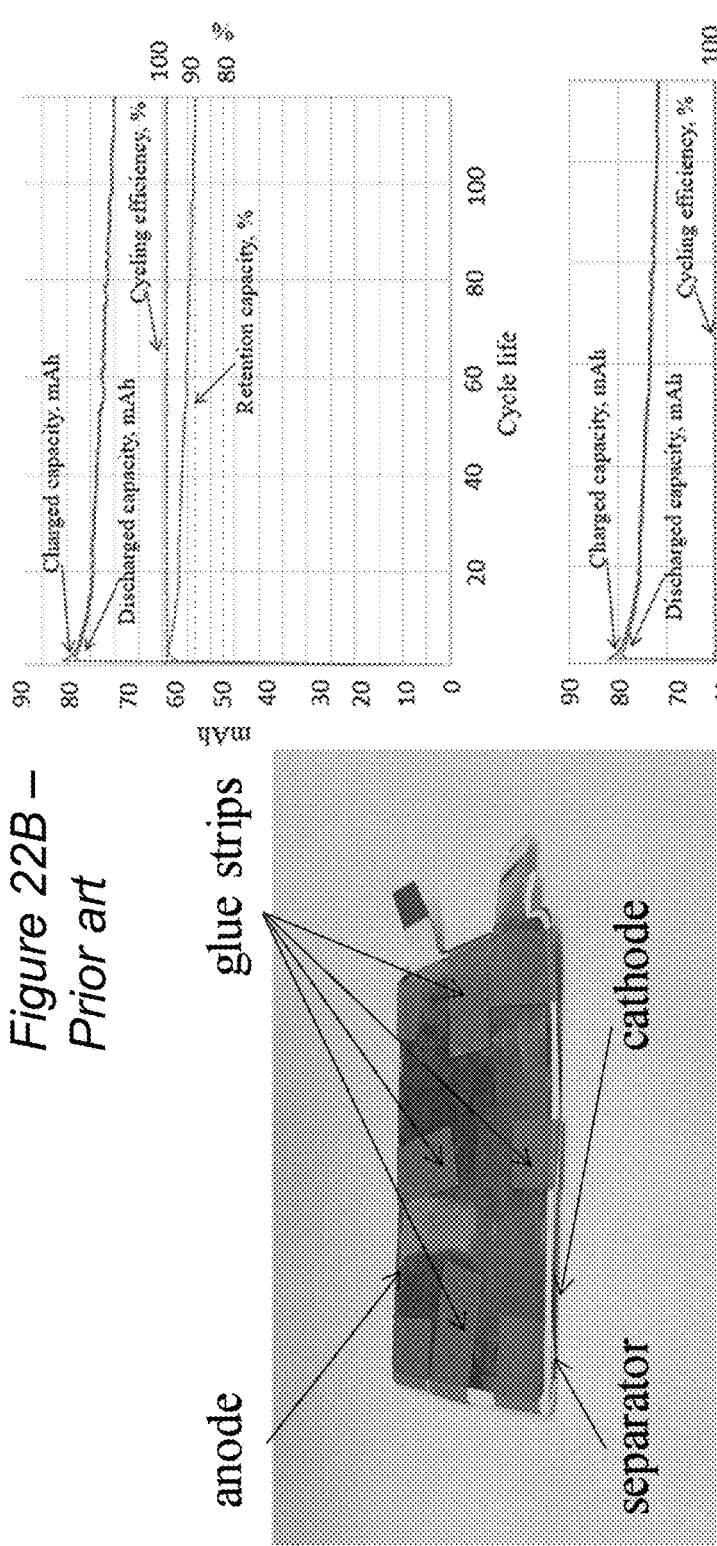
*Figure 22A – Prior art*
*Figure 22C*

US 10,003,060 B1

SURFACE ACTIVATION IN ELECTRODE STACK PRODUCTION AND ELECTRODE-PREPARATION SYSTEMS AND METHODS

CROSS REFERENCE TO RELATED APPLICATIONS

This application is a Continuation-in-part of U.S. patent application Ser. No. 15/431,793, filed Feb. 14, 2017 and entitled "Electrode stack production methods" which claims the benefit of U.S. Provisional Patent Application No. 62/435,865, filed Dec. 19, 2016; this application also claims the benefit of U.S. Provisional Patent Application No. 62/537,535, filed Jul. 27, 2017, all of which are hereby incorporated by reference in their entirety.

BACKGROUND OF THE INVENTION

1. Technical Field

The present invention relates to the field of cells in energy storage devices, and more particularly, to manufacturing of cell stacks with electrodes and to electrode production process modifications.

2. Discussion of Related Art

Energy storage devices can be found in an increasing number of applications, and they diversify in structure and components. Production processes of energy storage devices are complex with respect to mechanical steps and chemical considerations involved in the production. Constant demand exists for improving the performance of energy storage devices and for improving their production processes and quality of components.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method comprising surface treating the cell separator prior to attachment to at least one electrode, wherein the surface treating is configured to form binding sites on the cell separator and enhance binding thereof to the at least one electrode by creating the binding sites.

One aspect of the present invention provides a method comprising: surface treating at least one cell separator prior to attachment to at least one electrode, wherein the surface treating is configured to form binding sites on the at least one cell separator, and attaching the at least one cell separator to the at least one electrode by cold press lamination, wherein the created binding sites are configured to stabilize the cold press lamination electrostatically.

One aspect of the present invention provides a method comprising depositing an electrode slurry on a sacrificial film to form an electrode thereupon, wherein the electrode slurry comprises a first solvent, optionally surface treating the electrode, attaching (e.g., laminating) a current collector film, which is produced at least partly using a second solvent, onto the formed electrode, to yield a stack, wherein a binding strength of the electrode to the current collector film is higher than a binding strength of the electrode to the sacrificial film, and delaminating the sacrificial film from the electrode while maintaining the attachment of the electrode to the current collector film.

One aspect of the present invention provides an electrode-preparation method comprising: pressing at least two double-sided coated current collector foils between external coated foils, wherein the coatings on the double-sided foils face each other and the coatings of the respective external foils, and are pressed against each other, and preparing electrodes from at least one of the pressed double-sided coated current collector foils.

One aspect of the present invention provides a method comprising surface treating, prior to stack lamination, at least one cell separator and/or at least one electrode, wherein the surface treating is configured to form binding sites on the at least one cell separator and/or at least one electrode, respectively, and laminating, by cold press lamination, a stack of multiple alternating separators and electrodes, comprising the at least one separator and the at least one electrode, at least one of which being surface treated by said surface treating, wherein the created binding sites are configured to stabilize the cold press lamination electrostatically.

One aspect of the present invention provides an electrode-preparation method comprising: pressing at least two double-sided coated current collector foils between external coated foils, wherein the coatings on the double-sided foils face each other and the coatings of the respective external foils, and are pressed against each other, and preparing electrodes from at least one of the pressed double-sided coated current collector foils.

One aspect of the present invention provides a method comprising depositing an electrode slurry on a sacrificial film to form an electrode thereupon, wherein the electrode slurry comprises a first solvent, attaching (e.g., laminating) a current collector film, which is produced at least partly using a second solvent, onto the formed electrode, to yield a stack, wherein a binding strength of the electrode to the current collector film is higher than a binding strength of the electrode to the sacrificial film, and delaminating the sacrificial film from the electrode while maintaining the attachment of the electrode to the current collector film.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A-3C are high-level schematic illustrations of systems and methods of preparing electrode stacks, according to some embodiments of the invention.

FIG. 8 is a high-level schematic illustration of electrode foils and an electrode production system, according to some embodiments of the invention.

FIG. 9 is a high-level schematic illustration of prior art electrode production.

FIGS. 17A and 18A illustrate examples of cross-sections of prior art electrode foils.

FIGS. 17B and 18B illustrate examples of cross-sections of electrode foils prepared according to some embodiments of the invention.

FIGS. 19A-19C are examples for disclosed separators and stacks prepared according to disclosed methods, compared to prior art separators and stacks.

FIG. 19D is a SEM image of prior art double sided electrode (anode) produced not using the disclosed lamination process, and exhibiting rough and non-uniform anode surfaces.

FIG. 21 provides SEM images of the surfaces of anodes, cathodes and separators before and after surface treatment by plasma, in a non-limiting example, according to some embodiments of the invention.

FIGS. 22A-22C illustrate prior art cell assembly with its cycling characteristics; and cycling characteristics of laminated stacks illustrated in FIG. 19A, in a non-limiting example, according to some embodiments of the invention.

DETAILED DESCRIPTION OF THE INVENTION

Figure 1A:
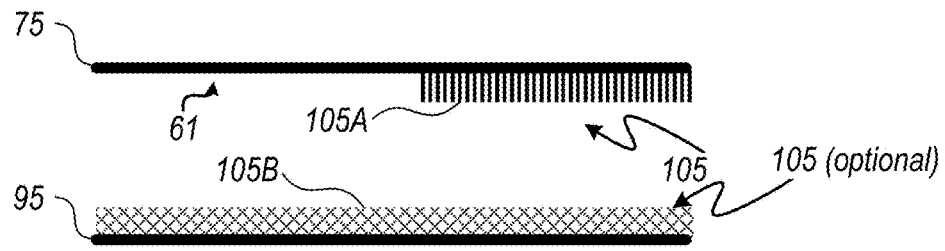
FIGS. 1A-1C are high-level schematic illustrations of surface treating the separator in methods of stack assembly, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Methods, stacks and electrochemical cells are provided, in which the cell separator is surface-treated prior to attachment to the electrode(s) to form binding sites on the cell separator and enhance binding thereof to the electrode(s), e.g., electrostatically, to improve contact and reduce resistance of the layers in the formed battery cell stack.

Methods, stacks and electrochemical cells are provided, in which the cell separator is surface-treated prior to attachment to the electrode(s) to form binding sites on the cell separator and enhance binding thereof to the electrode(s), e.g., electrostatically. The cell separator(s) may be attached to the electrode(s) by cold press lamination, wherein the created binding sites are configured to stabilize the cold press lamination electrostatically—forming flexible and durable electrode stacks. Electrode slurry may be deposited on a sacrificial film and then attached to current collector films, avoiding unwanted interactions between materials and in particular, solvents involved in the respective slurries. Dried electrode slurry layers may be pressed or calendared against each other to yield thinner, smoother and more controllably porous electrodes, as well as higher throughput. The produced stacks may be used in electrochemical cells and in any other type of energy storage device.

Methods, stacks and electrochemical cells are provided, which improve production processes and yield flexible and durable electrode stacks. Methods comprise depositing an electrode slurry on a sacrificial film to form an electrode thereupon, wherein the electrode slurry comprises a first solvent, attaching (e.g., laminating) a current collector film, which is produced at least partly using a second solvent that may be the same or different from the first solvent, onto the formed electrode, to yield a stack, wherein a binding strength of the electrode to the current collector film is higher than a binding strength of the electrode to the sacrificial film, and delaminating the sacrificial film from the electrode while maintaining the attachment of the electrode to the current collector film. Additional layers such as a cell separator and an additional electrode may be further attached using similar steps. Surface treatment of electrodes and/or separator further enhances the cell performance. The produced stacks may be used in electrochemical cells and in any other type of energy storage device.

Certain embodiments comprise cell stacks for lithium ion batteries, which comprise multiple stacked anodes and cathodes, separated by cell separator(s), with at least one of the anodes, the cathodes and the cell separators being surface treated to form binding sites upon surfaces thereof, and with the anodes, the cathodes and the cell separators being attached by cold press lamination, which is electrostatically stabilized by the created binding sites.

Electrode-preparation methods and systems are provided, in which coated foils, e.g., having dried electrode slurry layers on one or both sides of current collector films, are pressed against each other, with coating layers on the films facing each other and pressing each other. Particularly in lithium ion battery anodes made of metalloid anode material particles, the hardness of the particles may provide more efficient pressing when pressed against each other, than when pressed by an external calendar—leading to thinner, smother and more controllably porous electrodes and higher throughput. Two or more double-sided coated current collector foils may be pressed between external (possibly sacrificial) coated foils, with the coatings on the double-sided foils face each other and the coatings of the respective external foils. Electrodes (e.g., anodes, cathodes) may be prepared from the pressed double-sided coated current collector foils.

Figure 1B:
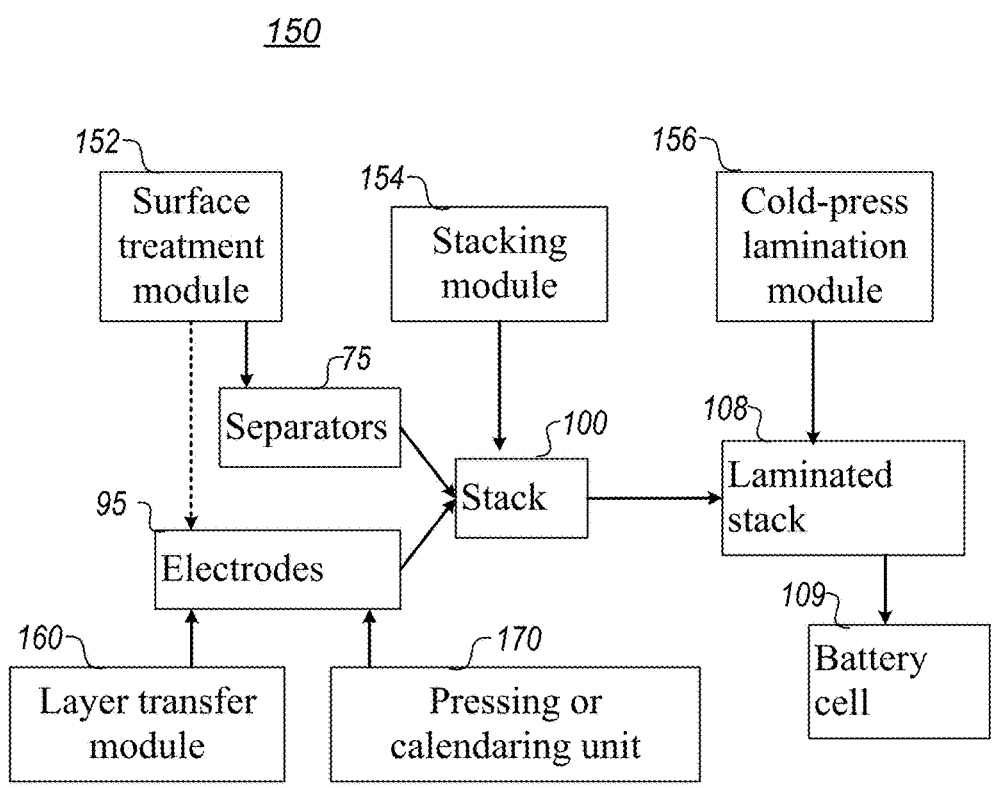
Figure 1C:
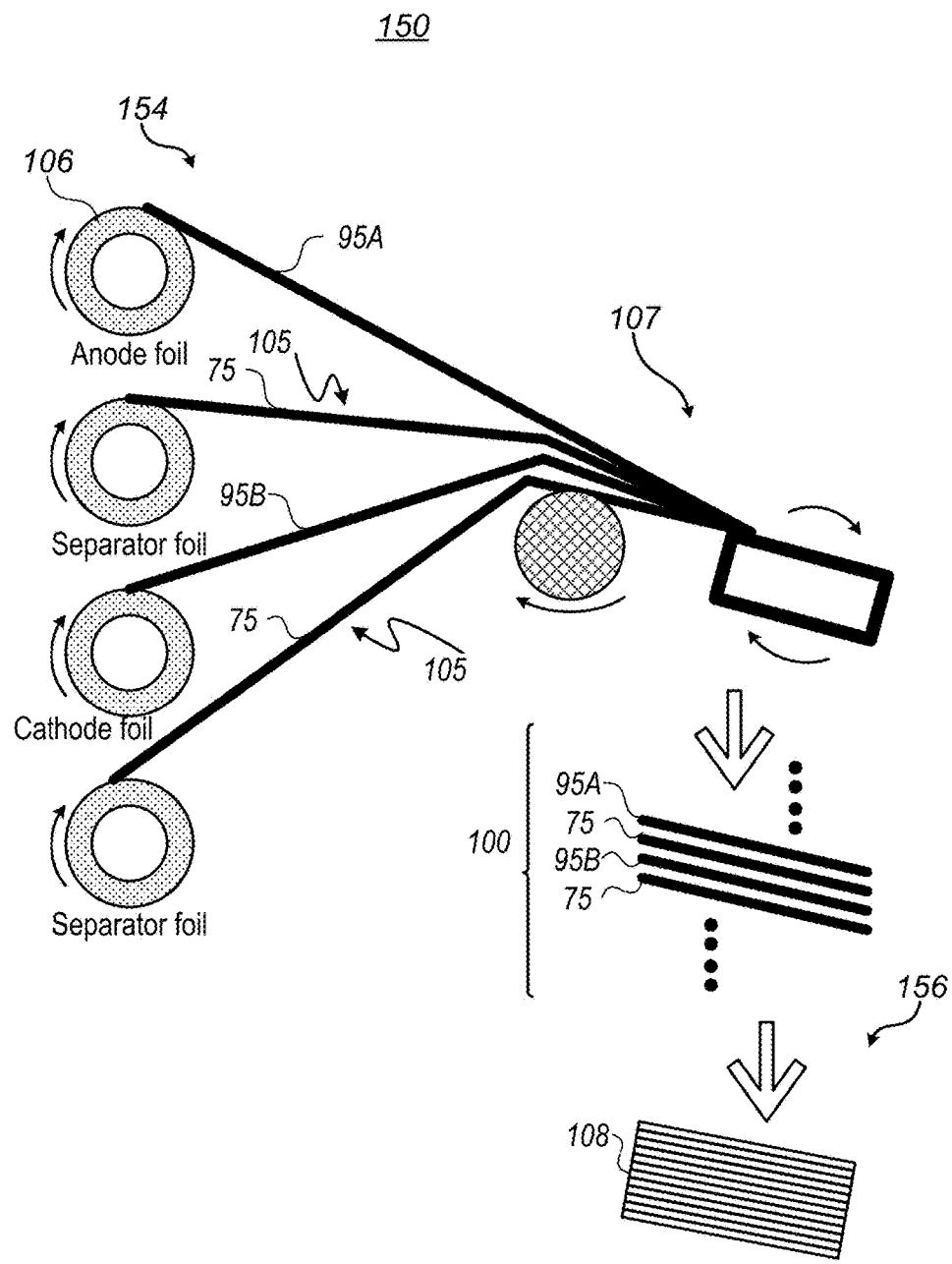

FIGS. 1A-1C are high-level schematic illustrations of surface treating a separator 75 in methods of stack assembly, according to some embodiments of the invention. Elements from FIGS. 1A-1C may be integrating in any of the following embodiments involving the stack's separator(s).

FIG. 1A illustrates schematically the formation of binding sites 105A on a separator 75, which enhance the binding of separator 75 to electrode(s) 95 by creating bond(s) with surface elements 105B on electrode(s) 95, such as oxides exposed on the surface of electrode 95, upon attachment or during the stack preparation processes. Advantageously, surface treatment 105 provides better attachment of treated surface 105A to electrode(s) 95 than untreated surface 61 (shown schematically, the numeral 61 is used to denote untreated prior art separators), in particular for separator(s) 75 comprising polymers such as any of polyethylene (PE), polypropylene (PP), polyethylene terephthalate (PET), poly vinylidene fluoride (PVDF), polymer membranes such as a polyolefin, polypropylene, or polyethylene membrane. Multi-membranes made of these materials, micro-porous films thereof, woven or non-woven fabrics etc. may be used as separator(s) 75 as well as possibly composite materials including, e.g., alumina, zirconia, titania, magnesia, silica and calcium carbonate along with various polymer components as listed above. For example, binding sites 105A may comprise oxygen termination of surface molecules such as carboxylates, hydroxyls, etc. which may react electrostatically with oxides exposed on the surface of electrode(s) 95, e.g., under pressure, when pressed against each other.

In certain embodiments, surface treatment 105 may be applied to one or both sides of electrode(s) 95 (e.g., anodes and/or cathodes) to form surface elements 105B thereupon, which then bind electrostatically to binding sites 105A on separator 75 upon cell assembly, such as upon cold pressing the stack assembly.

FIG. 1B is a high-level schematic illustration of a cell stack assembly system 150, according to some embodiments of the invention. System 150 may be used to implement any of the embodiments of the disclosed methods, and may be composed modularly from the following units, according to specifically required battery stack compositions and performance.

Cell stack assembly system 150 may comprise a surface treatment module 152 configured to treat one or both surfaces (possibly patch-wise) of each of a plurality of cell separators 75 (and possibly of electrode(s) 95), to form binding sites thereupon; a stacking module 154 configured to stack a plurality of alternating anodes and cathodes (as electrodes 95) between cell separators 75 to form a stack 100; and a cold-press lamination module 156 configured to cold-press stack 100, wherein the formed binding sites are configured to stabilize the cold-pressed stack electrostatically. Cold-press lamination module 156 is configured to press stack 100 to form a laminated stack 108 which may be used to form a battery cell 109.

In certain embodiments, cell stack assembly system 150 may further comprise a layer transfer module 160 (see, e.g., FIGS. 3A-6) configured to prepare electrode(s) 95 attached to corresponding current collector film(s) by depositing electrode slurry on a sacrificial film to form electrode(s) 95 thereupon. The electrode slurry comprises a first solvent, the current collector film is produced using a second solvent, and is attached onto the formed electrode. The binding strength of the electrode to the current collector film is higher than a binding strength of the electrode to the sacrificial film. Layer transfer module 160 is further configured to delaminate the sacrificial film from the electrode while maintaining the attachment of the electrode to the current collector film.

In certain embodiments, cell stack assembly system 150 may further comprise a pressing or calendaring unit 170 (see, e.g., FIGS. 8 and 10-18B) comprising two pressure-applying apparatuses facing each other and configured to receive and press, against each other, at least two double-sided coated current collector foils between external coated foils. The coatings on the double-sided foils face each other and the coatings of the respective external foils, and are pressed against each other. The two pressure-applying apparatuses are configured to apply pressure on the external coated foils to make the electrodes more uniform (with respect to electrodes press directly against the calendars. The external coated foils may also comprise electrode films (with electrode slurry coating(s)).

In various embodiments, pressing or calendaring unit 170 may be configured to operate at optimized parameters of pressure, time and optionally heat application. Pressing or calendaring unit 170 may be configured to adjust the porosity of electrode(s) 95 and in some embodiments, as part of the lamination process, attach separator(s) 75 to electrode(s) 95, utilizing surface treatment 105 applied to separator 75 and/or electrode(s) 95 to generate stable laminated stack 108. In certain embodiments, electrode porosity may thus be optimized during attachment in a single (pressing or calendaring) step, wherein the attachment is assisted by surface treatment 105. It is noted that either prior art calendaring (see e.g., FIG. 9) and/or disclosed calendaring processes according to various embodiments (see, e.g., FIGS. 8 and 10-16) may be used in embodiments of the production process, and in combination with surface treatment 105.

FIG. 1C illustrates schematically an example for stack assembly, utilizing rollers 106 of electrode foils (anode foil(s) 95A, cathode foil(s) 95B) and of separator foil(s) 75 and integrating the foils into a stack using additional rollers 107 (illustrated schematically) in various configurations—yielding stacks 100. Stack assembly processes, into which separator surface treatment may be integrated, comprise any of the following—single sheet stacking, winding, Z-folding with single electrodes, Z-folding with electrode rolls, and so forth, as explained in more details below. Surface treatment 105 may be applied to either side of separator patches or foils, continuously or intermittently, depending on the spatial relations of the respective side of separator 75 with electrode 95 it is designed to bind, e.g., anode 95A. Stack assembly may be carried out in electrode production system(s) 150, possibly comprising electrode and stack preparation systems and methods, and possibly pressure-applying apparatuses as disclosed below.

Certain embodiments comprise methods 200 disclosed below, stack assembly systems 150 and/or laminated stacks 108, comprising surface treating 105, prior to stack lamination, at least one cell separator 75 and/or at least one electrode 95, wherein surface treating 105 is configured to form binding sites on the at least one cell separator and/or at least one electrode, respectively, and laminating, by cold press lamination, a stack of multiple alternating separators and electrodes, comprising the at least one separator and the at least one electrode, at least one of which being surface treated by surface treating 105, wherein the created binding sites are configured to stabilize the cold press lamination electrostatically. The alternating separators and electrodes may be attached by any stack assembly process, such as single sheet stacking, winding, Z-folding with single electrodes and/or Z-folding with electrode rolls, and the surface treatment may be carried out by any of plasma treatment, corona treatment, ultraviolet radiation. The stack of multiple alternating separators and electrodes may comprise any of: a single separator and a single electrode, a single separator and two electrodes on either side thereof, a single electrode and two separators on either side thereof and/or an alternating plurality of separators and plurality of electrodes. In a non-limiting example, the stack of multiple alternating separators and electrodes may comprise a single separator foil and two electrodes foils which are laminated to on either side of the separator foil by a roll to roll process.

Figure 2:
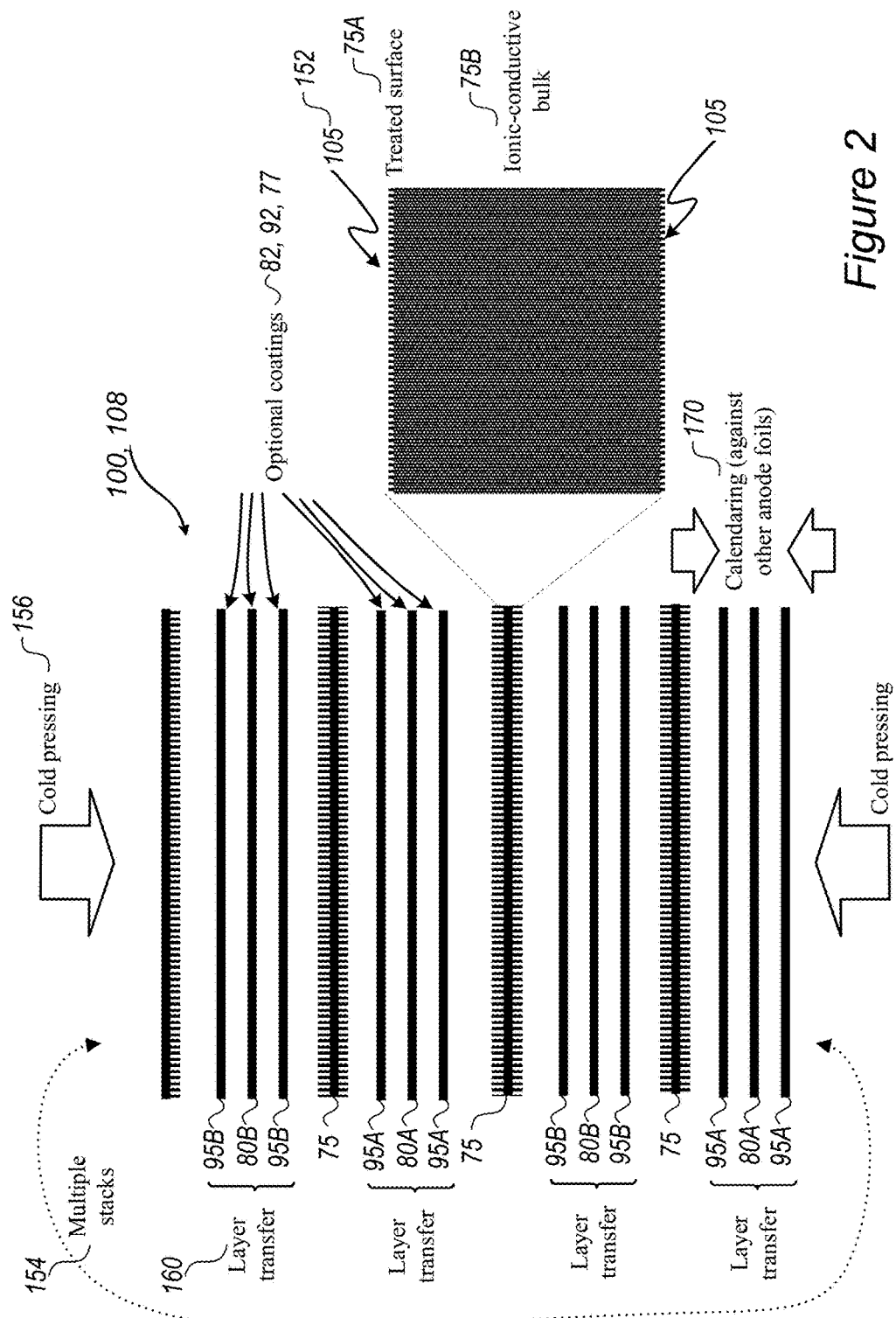
FIG. 2 is a high-level schematic illustration of cell stacks and their assembly, according to some embodiments of the invention.

FIG. 2 is a high-level schematic illustration of cell stacks 100 and their assembly, according to some embodiments of the invention. FIG. 2 illustrates schematically cell stack 100 in exploded view and, correspondingly, the structure of laminated stack 108 after cold-press lamination 156 (illustrated schematically by arrows). Optional processes of applying optional coatings 82, 92 and 77 to electrodes 95 (anodes 95A, cathodes 95B and corresponding current collectors 80A, 80B) (see FIGS. 3A-6 and corresponding description below), layer transferring 160 (e.g., by corresponding module 160), pressing or calendaring 170 (of one-another-facing electrodes, e.g., by corresponding unit 170) may be part of the stack assembly. The dotted arrow indicates the optional stacking of multiple sets of separators 75 and electrodes 95 to form stack 100.

In certain embodiments, multiple separators 75 and corresponding multiple alternating anodes and cathodes may be assembled into cell stack 100. In various embodiments, both the anode(s) and the cathode(s) may be attached to separator(s) 75 simultaneously by the cold pressing. The cold-press lamination may be carried out below any of 60° C. (e.g., as in the example below, at 55° C.), 50° C., 40° C. and/or at room temperatures, and surface treatment 105 may be carried out (be surface treating unit 152) by any of plasma treatment, corona treatment, ultraviolet radiation and/or possibly by depositing an ionic-conductive surface layer to form binding sites 105A.

In certain embodiments, cell separator(s) 75 may be polymeric (as disclosed above) and surface treatment 105 may comprise depositing a ceramic surface layer onto polymeric cell separator 75. As illustrated schematically in FIG. 2, surface treatment 105 may be configured to modify only treated surface 75A while maintaining the bulk properties of separator(s) 75 such as ionic conductivity of bulk 75B of separator(s) 75, possibly flexibility of separator(s) 75, interaction properties with the electrolyte etc. Treated surface 75A may be porous and ion-conductive, to maintain and/or enhance the performance of cell stack 108. Cold-press lamination 156 may be configured to ensure close contact between separator(s) 75 and electrode(s) 95.

Lamination of separator(s) 75 and electrode(s) 95 may be configured to reduce the resistance of laminated cell stack 108 and battery 109 with respect to prior art stack assembly methods, due to the close contact between separator(s) 75 and electrode(s) 95, based on the disclosed electrostatic binding. In certain embodiments, laminated cell stack 108 and battery 109 may be advantageous in fast charging applications, in which lower resistance is of particular advantage. Examples for fast charging applications comprise battery cells 109 configured to operate and high charging and/or discharging rates such as e.g., at least at a maximal charging and/or discharging rate of e.g., 5 C, or possibly 10 C or 50 C, or higher, with the C rate, or C ratio, being the charging or discharging current divided by the capacity.

Any of the disclosed systems and methods may be applied to anodes having Si (silicon), Ge (germanium), Sn (tin) and/or LTO (lithium titanium oxide, lithium titanate)-based anode active material and/or possibly carbon-based anode material such as graphite and/or graphene. The disclosed systems and methods may be applied to cathodes comprise materials based on layered, spinel and/or olivine frameworks, having various compositions, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides), LFP formulations (based on $LiFePO_4$), lithium rich cathodes, and/or combinations thereof. The disclosed systems and methods may be applied to electrolyte comprising liquid electrolytes such as ethylene carbonate (EC), diethyl carbonate (DEC), propylene carbonate (PC), fluoroethylene carbonate (FEC), ethyl methyl carbonate (EMC), dimethyl carbonate (DMC), vinylene carbonate (VC), possibly tetrahydrofuran (THF) and/or its derivatives, and combinations thereof and/or solid electrolytes such as polymeric electrolytes such as polyethylene oxide, fluorine-containing polymers and copolymers (e.g., polytetrafluoroethylene), and combinations thereof. The electrolyte(s) may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$, tris(trimethylsilyl)phosphate (TMSP) and combinations thereof. Electrolyte additive(s) (e.g., at few % wt) may comprise tris (trimethylsilyl)phosphite (TMSP), tris (trimethylsilyl) borate (TMSB), lithium difluoro(oxalato)borate (LiFOB), succinic anhydride, trimethyl phosphate (TMP) and triphenyl phosphate (TFP), fluorinated solvents (methyl non-afluorobutyl ether (MFE), and combinations thereof.

FIGS. 3A-3C and 4A-4C are high-level schematic illustrations of system 160 and method 200 of preparing electrode stacks 100, according to some embodiments of the invention. Elements from FIGS. 3A-3C and 4A-4C may be combined in any operable combination and the illustration of certain elements in certain figures and not in others merely serves an explanatory purpose and is non-limiting. Layer transferring may be carried out by layer transfer module 160 of cell stack assembly system 150.

FIGS. 3A-3C exemplify schematically the attachment of respective electrodes 95, namely an anode 95A and a cathode 95B, to respective current collector films 80, namely a copper (Cu) film 80A and an aluminum (Al) film 80B, respectively. Electrodes 95A, 95B (FIG. 3A) may first be formed on respective sacrificial films 90, namely a copper foil 90A and aluminum foil 90B, respectively, from respective electrode slurries involving certain solvents. Then, electrodes 95 on sacrificial films 90 are attached (220) to the corresponding current collector films 80 and sacrificial films 90 are delaminated (222) to yield respective stacks 100, namely anode-current collector stack 100A and cathode-current collector stack 100B, respectively. In certain embodiments, respective coatings 82, such as carbon and/or binder layers 82A, 82B may be applied to current collector films 80 prior to attachment 220 to enhance binding and/or improve the stack's operation. The binding strength of electrode 95 to current collector film 80 (with or without coating 82) is configured to be higher than the binding strength of electrode 95 to sacrificial film 90. In certain embodiments, layer 82 may comprise a thin carbon coating (e.g., ~1 μm thick) or a conductive adhesive. FIGS. 3B and 3C illustrate additional attachment modes disclosed below. Elements shown separately in FIGS. 3A-3C, and in other figures, may be combined to form various embodiments of the disclosed invention.

The inventors have found out that direct application of the electrode slurry on the current collector film often results in interactions between the solvents used to form the electrode slurry and solvents which were used in production of the current collector film and/or degradation of current collector 80 due to solvent ingredients. Even though these interactions may be useful for the enhancement of binding strength between the current collector and the electrode coating, these interactions, if excessive, may deteriorate the performance of the respective prior art electrodes and the prior art cells having these electrodes. Furthermore, during and after the electrode slurry application onto the current collector in the prior art, problems related to the poor wettability of the current collector by the electrode slurry may arise. These problems may result in coating defects and poor adhesion of the resulting coating to the current collector. However, the inventors have found out that forming the electrode of the sacrificial film and then transferring the electrode as disclosed herein to the current collector film solve these problems and provide flexible electrode stacks with improved performance. Moreover, disclosed embodiments may provide sufficient binding strength between the current collector and the electrode coating.

In certain embodiments, the surface of one or more of electrodes 95 (e.g., anode 95A, cathode 95B) may be pretreated 105 to enhance its adhesion to current collector film 80 (with or without coating 82). In certain embodiments, with uncoated current collector film 80, the surface of one or more of current collector film 80 (e.g., Cu film 80A or Al film 80B) may be pretreated 105 to enhance its adhesion to respective electrode(s) 95. In certain embodiments, coated films may also be pre-treated to enhance the respective binding to adjacent layer. Achieved adhesion enhancement may improve the integration of the respective layer and provide more uniform and compact cell structures, resulting in improved electrolyte wetting, cell conductivity (e.g., reduce ESR—equivalent series resistance) and other cell characteristics. For example, plasma treatment 105 may be applied to activate the respective surface(s) prior to pressing the respective layers, to enhance their attachment (e.g., lamination) by resulting electrostatic forces between the activated surface and the layer connected thereto. Surface treatment 105, such as by plasma, may be configured to affect only the surface and not deteriorating the bulk properties of the treated layer, and may additionally improve wetting and ionic conductivity of the treated surface.

The electrode slurry may comprise a water or organic solvent, active material(s), conductive agent(s) and/or binder(s), and be dried, e.g., by evaporation of the solvent, to form electrode 95 on sacrificial film 90 prior to its attachment to current collector 80. Attachment 220 may be carried out by bringing electrode 95 into close contact with current collector 80 which may be coated by an adhesive conductive layer coating facing electrode 95. As the surface of current collector 80 may be undesirably altered by an excessive interaction with the solvent of the electrode slurry, allowing the solvent to at least partially evaporate prior to the attachment prevents or at least significantly reduces such an excessive interaction. The attachment may be carried out in a lamination process. Sacrificial film 90 may be delaminated 222 from electrode 95 after attachment 220, e.g., by peeling it off the electrode, leaving behind stack 100 with current collector 80 attached to electrode 95, which exhibits highly improved adhesion, cohesion and flexibility.

Method 200 enables fabrication of mechanically strong and flexible electrodes for energy storage devices. Advantageously, disclosed method 200 provides any of the following: improved adhesion (bonding of electrode 95 to current collector 80), improved cohesion (e.g., in electrode 95, bonding between active material, conductive additive particles and binder), improved flexibility of electrode 95, decreased binder content in electrode 95, and method 200 prevents the undesirable interaction of current collector 80 and/or adhesive layer 82 with slurry solvents, thus preventing the wettability issues or corrosion of current collector 80 which are typical in the prior art.

Advantageously, method 200 may be configured to further enable mitigation and/or avoid wettability problems as compared with the direct coating of the electrode slurry onto the current collector, carried out in the prior art. For example, common prior art practice is to use NMP (N-methyl-2-pyrrolidone) as the solvent in the electrode slurry, however NMP may attack carbon coating 82 on current collector film 80 until the slurry has dried. As a result, carbon coating 82 may not function properly.

As the risk of solvent influence on current collector 80 is reduced, selection and optimization of active materials, binders and conductive agents in the electrode slurry may be carried out to a larger extent. The formulation of the slurry may be selected to ensure the optimized packing density and related porosity of electrode 95 to provide optimal energy and power density of the energy storage device.

Sacrificial film 90 may comprise a metal foil and/or a polymeric foil or film. Sacrificial film 90 may comprise an anti-adhesive coating 92 that makes the transfer process easy. In particular, coating 92 (and/or coating 82) may be selected so that the binding strength of electrode 95 to current collector film 80 (possibly via coating 82) is higher than the binding strength of electrode 95 to sacrificial film 90 (possibly via coating 92), as indicated schematically in FIG. 3B.

Current collector film 80 may be made of various materials (e.g., copper or aluminum) and may be formed as a foil, a film, a grid or any other configuration. Coating 82 may be an adhesive conductive coating, such as a mixture of conductive particles (for example, carbon black, graphite, graphene or metal particles) and polymeric binder (for example, PVDF (polyvinylidene difluoride), PTFE (polytetrafluoroethylene), acrylic resins, elastomers, water-soluble polymers and the likes). At least one of the binders used in the electrode slurry and in the adhesive coating may be configured to increase the adhesiveness between electrode 95 and current collector film 80, in certain embodiments, under influence of temperature and/or pressure during attachment (e.g., lamination) stage 220 and possibly in delamination 222 stage, due to, for example, thermoplastic properties of the respective binder polymer. In certain embodiments, surfaces of electrode 95 and/or current collector film 80 and/or coating 82 may be wetted by an appropriate solvent to increase adhesive property, transferability and/or conformability. FIG. 3C illustrates schematically the optional wetting 91 of the interface between electrode 95 and sacrificial film 90 (possibly as a residual solvent from the electrode slurry), wetting 96 of electrode 95 and/or wetting 81 of current collector film 80 and/or coating 82.

Attachment 220 may be carried out by lamination, e.g., by hot roll press, followed by separation of respective copper or aluminum foils 90A, 90B respectively as delamination 222.

The following are more detailed examples for preparing anode stack 100A and cathode stack 100B. Anode stack 100A was prepared from a water-based anode slurry comprising carbon/tin composite as the active material, carbon black as the conductive agent and CMC (carboxymethyl cellulose) as the binder, spread onto a copper foil substrate as sacrificial film 90. The thickness was controlled by using a doctor blade with 50 µm, 100 µm and 120 µm gaps. Coated samples were dried in a convection oven for one hour at 80° C. to evaporate the solvent and form electrode 95 on copper sacrificial film 90. In a tape test using an adhesive tape, a significant portion of the coating (electrode 95) was removed with the tape, as a simulator for current collector film 80. After the coated samples were crumpled, electrode coating flaked off (delaminated) from the copper substrate. For preparation of stack 100A, a commercial copper substrate with carbon coating was used as current collector film 80 and carbon/tin electrode was attached to carbon coating 92. The sandwiched sample was passed through a gap between a pair of stainless steel rolls heated up to 120° C. for attachment 220. After cooling down to room temperature, stack 100A was disassembled. Electrode 95, which initially was on copper sacrificial film 90 prior to the hot pressing, was transferred onto carbon coated substrate 80. Using the tape test, it was found that electrode 95 was firmly attached to carbon coated substrate 80. Over time, no crumpling or damage of electrode 95 were observed and no delamination was shown, illustrating the stability and flexibility of stack 100A.

Similarly, cathode stacks 100B may be produced using an electrode slurry containing $LiCoO_2$ as an active material, CMC as the binder, carbon black as the conductive additive and water as the solvent. The cathode slurry was coated onto a 15 micron-thick aluminum foil as sacrificial film 90 and dried at 80° C. to produce cathode 95. Cathode 95 was then transferred to a commercial aluminum foil used as current collector film 80 having carbon coating 82 on the both sides of the foil using hot roll press heated up to 80° C. In certain embodiments, anodes 100A and cathodes 100B produced as disclosed herein may exhibit improved mechanical stability.

Figure 4A:
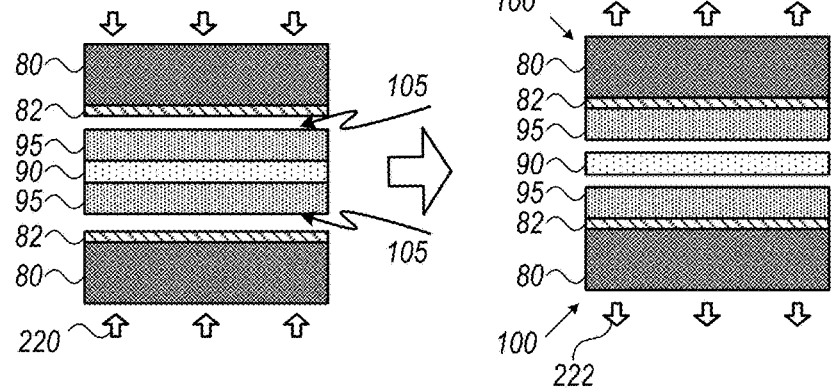
FIGS. 4A-4C are high-level schematic illustrations of derived processes for preparing various stacks using the method, according to some embodiments of the invention.
Figure 4B:
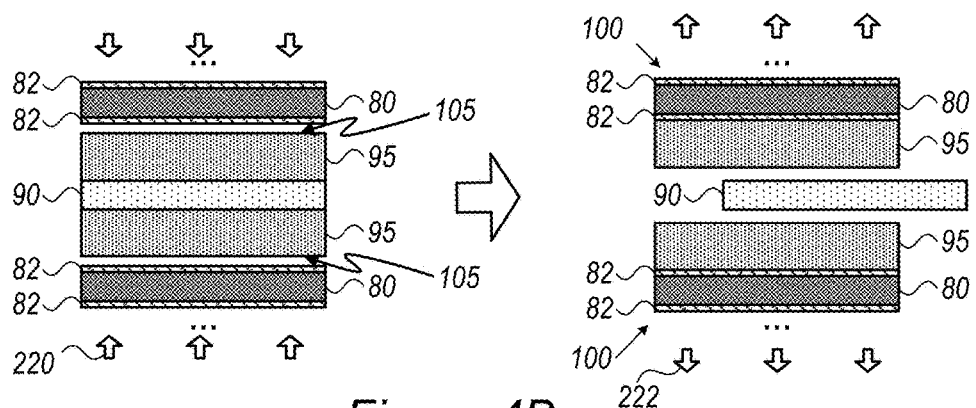
Figure 4C:
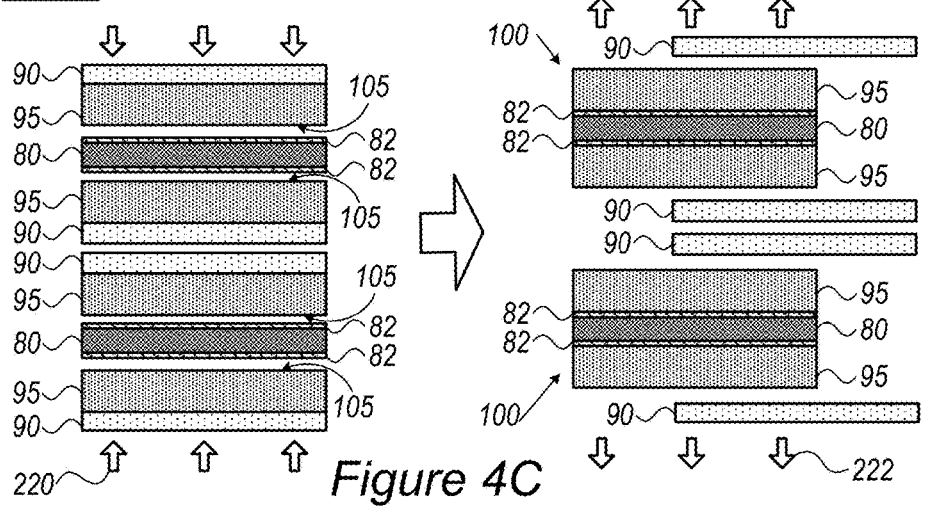

FIGS. 4A-4C are high-level schematic illustrations of processes for preparing various stacks 100 using method 200, according to some embodiments of the invention. FIG. 4A illustrates schematically the preparation of two stacks 100 simultaneously by applying electrode slurry to both sides of sacrificial film 90 to produce electrodes 95 on both sides thereof and then attaching current collector films 80 (possibly with coatings 82) to both electrodes 95 simultaneously. Delamination 222 may be synchronous or sequential to yield stacks 100. FIG. 4B illustrates schematically a similar double-sided preparation with ( . . . ) indicating possible additional layers attached on the other sides of current collector films 80 (possibly with coatings 82), possibly with additional cell components. FIG. 4C illustrates schematically simultaneous production of two double-sided stacks 100, each having current collector films 80 (possibly with coatings 82) with electrodes 95 on either side thereof. It is noted that in any of the illustrations, current collector films 80, coatings 82, electrodes 95 and sacrificial films 90 may be of different kinds in a single process, as long as the relations in binding strength illustrated in FIGS. 3B, 3C are maintained.

In certain embodiments, the surface of one or more of electrodes 95 and/or current collector film 80 (when not coated) may be pretreated 105 to enhance its adhesion to respective adjacent current collector film 80 and/or electrode 95. In certain embodiments, coated films may also be pre-treated to enhance the respective binding to adjacent layer. Achieved adhesion enhancement may improve the integration of the respective layer and provide more uniform and compact cell structures, resulting in improved electrolyte wetting, cell conductivity (e.g., reduce ESR—equivalent series resistance) and other cell characteristics. For example, plasma treatment 105 may be applied to activate the respective surface(s) prior to pressing the respective layers, to enhance their attachment (e.g., lamination) by resulting electrostatic forces between the activated surface and the layer connected thereto. Surface treatment 105, such as by plasma, may be configured to affect only the surface and not deteriorating the bulk properties of the treated layer, and may additionally improve wetting and ionic conductivity of the treated surface.

Figure 5:
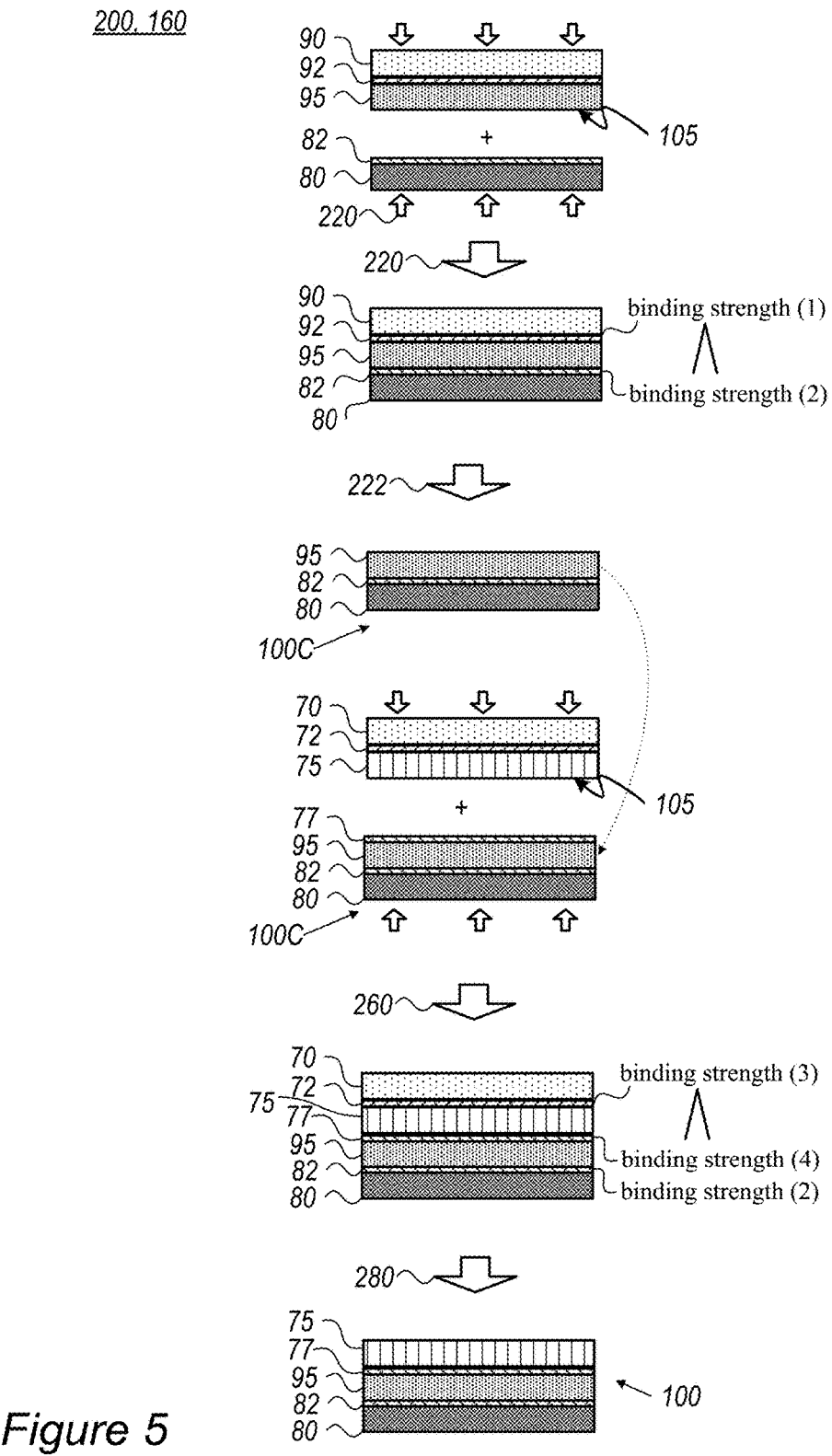
FIG. 5 is a high-level schematic illustration of stacks having electrode(s) and cell separator(s) prepared by the method, according to some embodiments of the invention.

FIG. 5 is a high-level schematic illustration of stacks 100 having electrode(s) and cell separator(s) 75, prepared by method 200, according to some embodiments of the invention. FIG. 5 is a highly schematic illustration of multi-stage method 200, which may be implemented with different variations to produce various stacks 100. Layer transferring may be carried out by layer transfer module 160 of cell stack assembly system 150. The term "cell separator" refers to a separator film in an electrochemical cell or in any other type of energy storage device. For example, separator(s) may comprise various materials, such as any of polyethylene (PE), polypropylene (PP), polyethylene terephthalate (PET), poly vinylidene fluoride (PVDF) and/or other appropriate materials. As non-limiting examples, a polymer membrane such as a polyolefin, polypropylene, or polyethylene membrane, a multi-membrane thereof, a micro-porous film, or a woven or non-woven fabric may be used as the separator. In certain embodiments, composite separators may be prepared from combinations of alumina, zirconia, titania, magnesia, silica and calcium carbonate along with various polymer components as listed above.

Following attachment 220 of electrode 95 to current collector film 80 and delamination 222 of sacrificial film 90 (with respective binding strengths (2)>(1)) to form and intermediate stack 100C, as illustrated schematically in FIGS. 3A-3C, a cell separator slurry (prepared using a third solvent which may attack electrode 95 and/or a coating 77 attached thereto if brought in direct contact with the cell separator slurry) may be spread onto a sacrificial film 70 and dried thereupon (e.g., by evaporation) to form cell separator 75. Possibly a coating 72 may be applied to sacrificial film 70 prior to the deposition of the cell separator slurry to regulate the binding strength (3) there between, and possibly coating 77 may be applied to electrode 95. At an attachment stage 260, cell separator 75 may be attached to electrode 95 and sacrificial film 70 may then be delaminated 280 to form stack 100 with current collector film 80, electrode 95 and cell separator 75, possibly with coatings 82, 77 which regulate conductivity and adhesiveness between the layers of stack 100. In particular, the binding strengths (2), (4)

between layers of stack 100 are higher that binding strength (3) between cell separator 75 and sacrificial film 70 (and/or its coating 72) to maintain the stack structure through the attachment and delamination processes. Attachment and delamination processes 220, 260 and 222, 280 respectively, may be configured to enhance these differences in binding strengths, e.g., increase binding strengths (2), (4) and/or reduce binding strengths (1), (3). Application of pressure and possibly heat may be configured accordingly.

In certain embodiments, the surface of separator 75 (and/or possibly of respective electrode 95 if not coated) may be pretreated 105 to enhance its adhesion to respective adjacent electrode 95. Separator pretreatment 105 may be similar or different from electrode or current collector film pretreatment 105. In certain embodiments, coated films may also be pre-treated to enhance the respective binding to an adjacent layer. Achieved adhesion enhancement may improve the integration of the respective layer and provide more uniform and compact cell structures, resulting in improved electrolyte wetting, cell conductivity (e.g., reduce ESR—equivalent series resistance) and other cell characteristics. For example, plasma treatment 105 may be applied to activate the respective surface(s) prior to pressing the respective layers, to enhance their attachment (e.g., lamination) by resulting electrostatic forces between the activated surface and the layer connected thereto. Surface treatment 105, such as by plasma, may be configured to affect only the surface and not deteriorating the bulk properties of the treated layer, and may additionally improve wetting and ionic conductivity of the treated surface. It is emphasized that disclosed surface treatment 105 is configured to enhance the lamination of the layers and the compactness of the resulting structure, as disclosed herein.

In certain embodiments, surface treatment 105 of separator 75 may be configured to create oxygen termination of surface molecules such as carboxylates, hydroxyls, etc. which may react electrostatically with oxides exposed on the surface of electrode(s) 95 (e.g., anode 95A, cathode 95B) under pressure, when pressed against each other. Consequently, improved integration (or lamination) of separator 75 and electrode(s) 95 may be achieved.

Surface treatment 105 of separator 75 may be carried out using various technologies, such as plasma, corona, ultraviolet radiation (UV) etc. Surface treatment 105 may be applied a specified period prior to attachment of separator 75 and electrode(s) 95, which is configured to maintain the required activation of the surface of separator 75, e.g., maintain its electrostatic activation, a required density of oxygen termini etc.

In certain embodiments, exposed surface features of electrode(s) 95 may suffice to bind the treated surface of separator 75, e.g., due to defects and/or due to characteristics of the anode active material. In other embodiments, the surface of electrode(s) 95 may be treated to providing binding sites to the treated surface of separator 75. In certain embodiments, the anode active material may comprise metalloids such as silicon, germanium and/or tin and separator 75 may comprise compatible materials such as silica or equivalent oxides, to enhance the binding capacity of surface-treated separator 75 to electrode(s) 95.

Surface treatment 105 of separator 75 may be incorporated in a range of cell assembly and stacking techniques, implementing any of winding, stacking and folding of electrodes 95 and separator 75, such as e.g., single sheet stacking (attaching discrete electrodes 95 and separator 75 elements), winding (attaching electrodes 95 and separator 75 in foils, using two separator rolls to fully fold the anodes and cathodes into the stack), Z-folding with single electrodes (discrete electrodes 95 folded into separator 75 foil, with separator 75 contacting the anodes at alternating faces thereof), Z-folding with electrode rolls, etc. Surface treatment 105 of separator 75 may be configured and applied to one or both sides of separator 75 and/or possibly at patches thereof configured to be attached to the anodes and/or to the cathodes, depending on the respective stack assembly process.

Advantageously, in certain embodiments, lamination of lithium battery electrodes to standard separators utilizing surface activation treatments on the separators may be applied without using adhesion promoters to avoid closing pores in the attached surfaces and thereby avoid increasing the cell resistance. Surface treatment may also be utilized to enhance surface wetting by the electrolyte. Using surface treatment to enhance lamination by utilizing electrostatic forces between surface anchoring groups on separator 75 and electrodes 95 may significantly improve cell integration and compactness, while maintaining low cell resistance.

Method 200 may further comprise attaching a second electrode, possibly attached to another current collector film (not shown) to cell separator 70 along similar process steps as illustrated in FIG. 5, to produce stack 100 having an anode and a cathode, each with the corresponding current collector film, separated by a cell separator. Such stack 100 may then be used directly to form the electrochemical cell or energy storage device cell.

Figure 6:
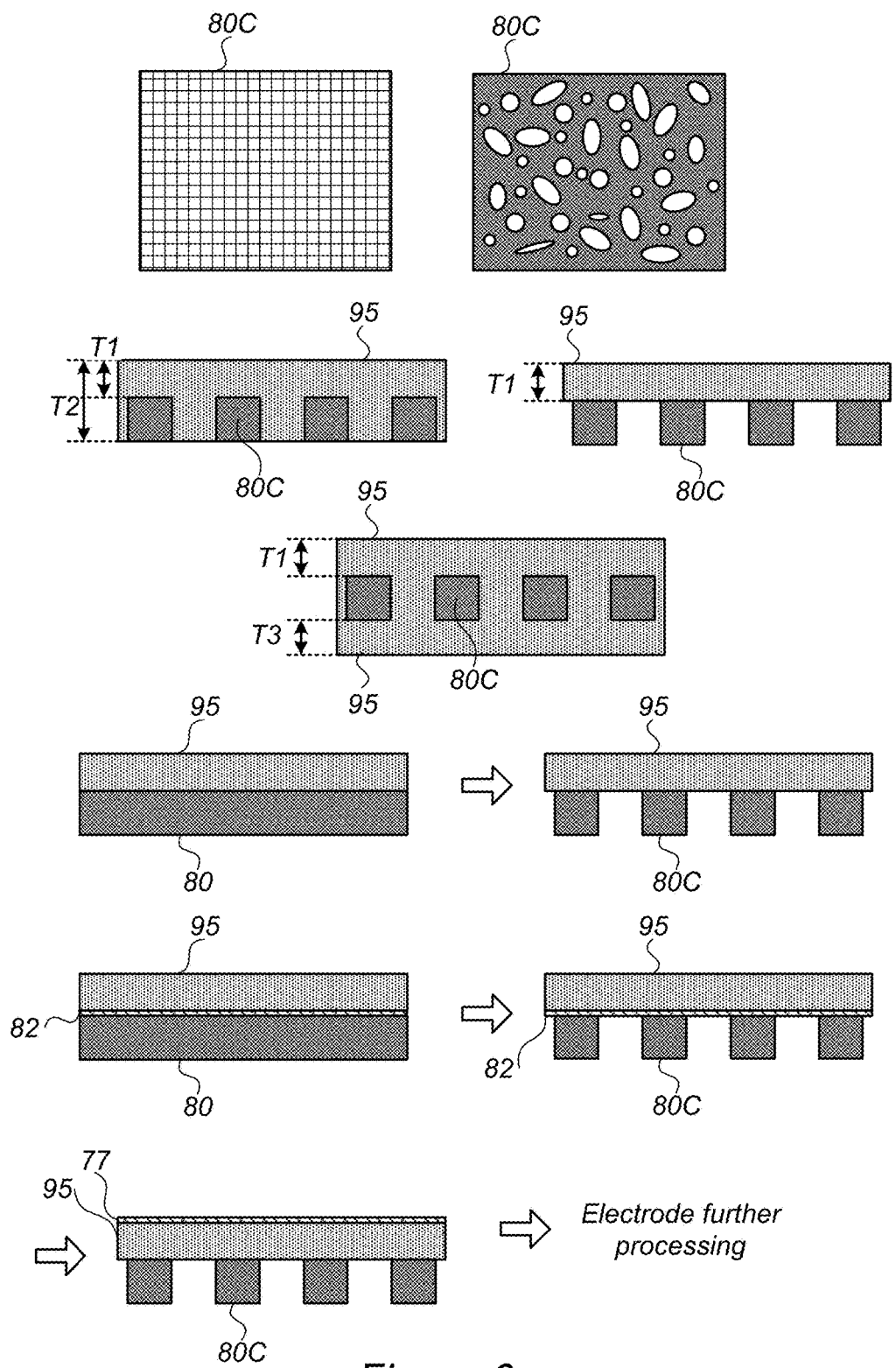
FIG. 6 is a high-level schematic illustration of using structures as the current collector, which may be patterned, mesh-like and/or foam-like, according to some embodiments of the invention.

FIG. 6 is a high-level schematic illustration of using structures 80C as current collector 80, which may be patterned, mesh-like and/or foam-like according to some embodiments of the invention. Structures 80C may be applicable as any type of current collector 80, 80A, 80B. Structures 80C may be patterned in various patterns, comprise a mesh or be mesh-like, comprise a foam or be foam-like, and so forth (two non-limiting examples, mesh and pattern/foam are illustrated schematically in FIG. 6). In some embodiments, structures 80C may be used as current collector 80, with the pitch, or characteristic size, and the electrode thickness being optimized for the transfer mechanism described above.

FIG. 6 further illustrates schematically various configurations for using structures 80C to produce, e.g., one sided electrodes 95 with variable thickness (T1, T2) or uniform thickness (T1) on structures 80C, and two-sided electrodes 95 with variable thickness (T1, T3) or uniform thickness (for T1=T3) on structures 80C.

Method 200 may further comprise using structures which are patterned, mesh-like and/or foam-like for the current collector (stage 216, in FIG. 7), illustrated in FIG. 6 as optionally starting from a uniform structure 80 and/or optionally applying coating 82 as described above. In certain embodiments, uniform structure 80 may be patterned or otherwise modified (e.g., mechanically or chemically) to provide structures 80C. Electrode 95 may then be coated e.g., by coating 77 and be further processed (e.g., mechanically or chemically, such as by etching), possibly involving additional deposition and transfer steps to form stack 100.

Advantageously, using patterned, mesh-like and/or foam-like structures 80C may improve the access of ions to electrode 95 through open vias provided by structures 80C, possibly to both sides of electrode 95. Patterned, mesh-like and/or foam-like structures 80C may be particularly advantageous in high specific energy thin layer electrodes 95 (e.g., having thickness, e.g., T1, T2 and/or T3 of any of 10 µm, 20 µm, 50 µm, 100 µm, 200 µm, etc.).

In some embodiments, structures 80C may be used either directly as current collector 80 and/or as sacrificial film 70 for transferring electrodes 95.

In some embodiments, method 200 may be used to coat an adhesion layer in a similar manner as described for electrode 95. Particular advantages of method 200 in case of the adhesion layer result from the very small thickness of the adhesion layer, which impedes application of the adhesion layer in the prior art.

Certain embodiments comprise stacks 100 described herein, as produced by method 200, and electrochemical cells comprising stacks 100. Elements from FIGS. 1-6 may be combined in any operable combination, and the illustration of certain elements in certain figures and not in others merely serves an explanatory purpose and is non-limiting.

Figure 7:
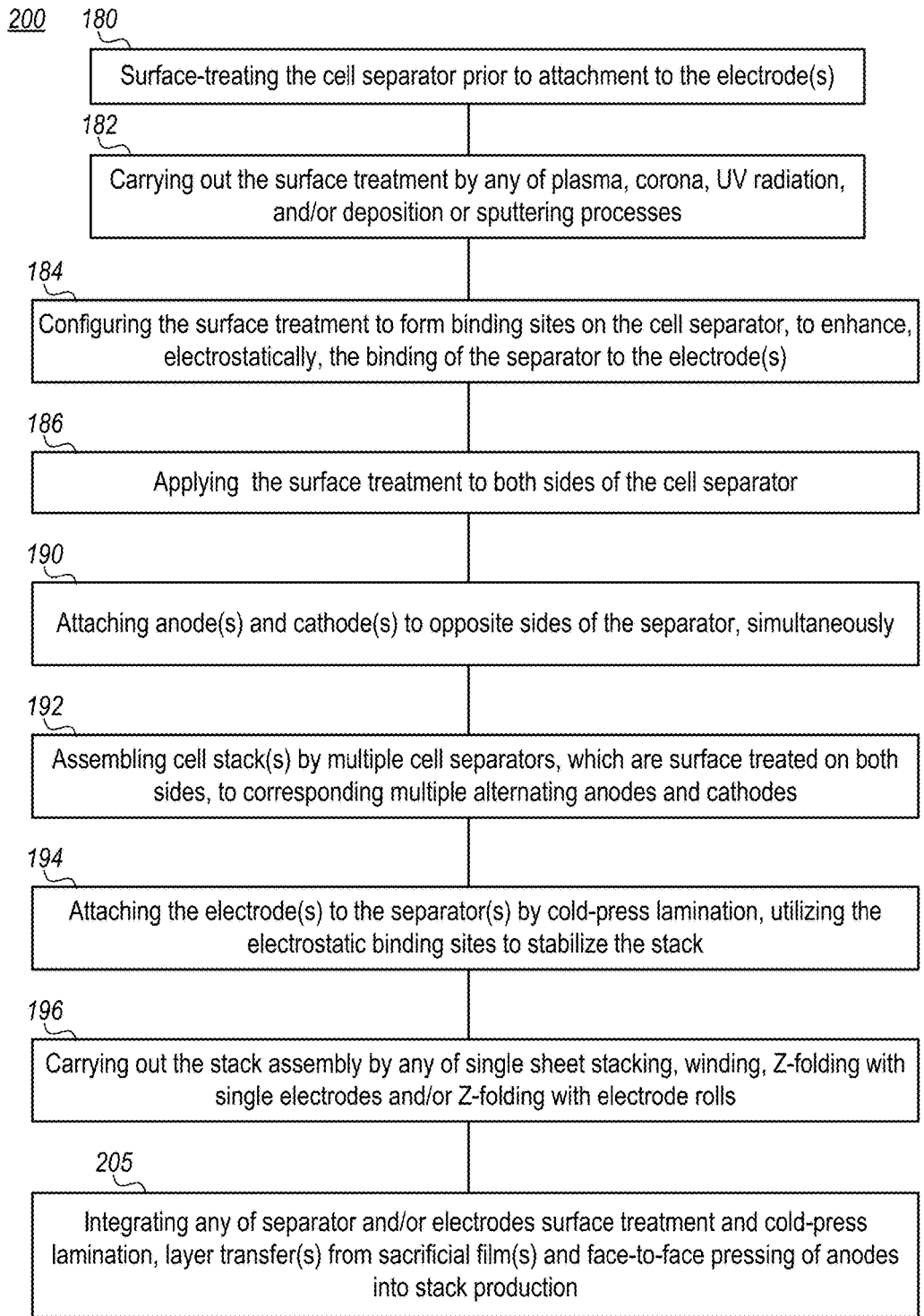
FIG. 7 is a high-level flowchart illustrating methods, according to some embodiments of the invention.

FIG. 7 is a high-level flowchart illustrating methods 200, according to some embodiments of the invention. The method stages may be carried out with respect to stacks 100 described above, which may optionally be configured to implement method 200. The stages of method 200 may be implemented irrespective of their order.

In certain embodiments, method 200 may comprise surface treating the cell separator prior to attachment to at least one electrode (stage 180), and configuring the surface treatment to form binding sites on the cell separator and enhance, electrostatically, the binding thereof to the electrode(s), through the binding sites (stage 184). For example, surface treatment 105 may comprise any of plasma, corona, UV radiation, and/or deposition or sputtering processes (stage 182). Surface treatment 105 may be applied on one or both sides of the cell separator(s) (stage 186). For example, the cold press lamination is carried out below 50° C.

In certain embodiments, method 200 may further comprise attaching anode(s) and cathode(s) to opposite sides of the separator, simultaneously (stage 190), assembling cell stack(s) by multiple cell separators, which may be surface-treated on both sides, to corresponding multiple alternating anodes and cathodes (stage 192) and attaching the electrode(s) to the separator(s) by cold-press lamination, utilizing the electrostatic binding sites to stabilize the stack (stage 194). In certain embodiments, method 200 may comprise carrying out the stack assembly by any of single sheet stacking, winding, Z-folding with single electrodes and/or Z-folding with electrode rolls (stage 196).

In various embodiments, method 200 may further comprise integrating any of separator and/or electrodes surface treatment and cold-press lamination, layer transfer(s) from sacrificial film(s) and face-to-face pressing of anodes into stack production (stage 205).

Method 200 comprises depositing an electrode slurry (comprising a first solvent) on a sacrificial film to form an electrode thereupon (stage 210), attaching (e.g., laminating) a current collector film (which is produced at least partly using a second solvent) onto the formed electrode to yield a stack (stage 220). Any of the components are configured so that the binding strength of the electrode to the current collector film is higher than the binding strength of the electrode to the sacrificial film (stage 221). Method 200 may further comprise applying at least a pressure on the stack to carry out the lamination (and possibly the delamination) (stage 224), e.g., by pressing or calendaring, optionally also applying heat to carry out the lamination to enhance the binding strength of the cell separator to the electrode. Method 200 further comprises delaminating the sacrificial film from the electrode while maintaining the attachment of the electrode to the current collector film (stage 222).

Method 200 may comprise, e.g., as implementations of stage 221, any of coating the current collector film with a conductive adhesive prior to attaching 220 and/or surface treating the current collector film prior to attaching 220 (stage 212); coating the electrode with a conductive adhesive such as a carbon coating prior to attaching 220 and/or surface treating the electrode prior to attaching 220 (stage 214); and/or coating the sacrificial film, prior to depositing 210, with a coating having a lower binding strength to the electrode than the binding strength of the electrode to the current collector film (stage 218). In certain embodiments, method 200 further comprises pretreating at least one side of the electrode (stage 219).

Method 200 may optionally further comprise applying at least a pressure on the stack produced after delamination stage 222 e.g., by pressing or calendaring, optionally also applying heat and configuring the applied pressure (and optionally heat) to enhance the binding strength of the cell separator to the electrode (stage 225). In certain embodiments, method 200 may comprise wetting at least one of the electrode and the current collector film to enhance adhesiveness therebetween (stage 228).

In certain embodiments, disclosed methods, stacks and electrochemical cells implementing any of surface-treated separators, layer transferring using sacrificial films and/or face-to-face calendaring of the electrode material may be combined and integrated to yield flexible and durable electrode stacks.

FIG. 7 further illustrates a non-limiting example for an electrode production method 200A as part of method 200 disclosed herein, according to some embodiments of the invention. The method stages may be carried out with respect to electrode production system 150 and/or electrodes 95 described above, which may optionally be configured to implement method 200A. Method 200A may comprise stages for producing, preparing and/or using electrode production system 150 and/or electrodes 95, such as any of the following stages, irrespective of their order.

In certain embodiments, method 200 may comprise preparing electrode foils by pressing (e.g., calendaring) two coated films (e.g., having coatings of dried electrode slurry), with the coatings on the films facing each other and pressing each other (stage 230). Method 200 may comprise configuring the electrode production system to press pairs of coated electrode foils against each other, so that the coatings (e.g., dried electrode slurries) apply forces on each other (stage 232).

In certain embodiments, pressing 210 may be configured to enable and/or cause mass transfer between protrusions and cavities in the film coatings (e.g., of the dried electrode slurry layers) to even out surfaces thereof (stage 234).

Certain embodiments comprise pressing at least two double-sided coated current collector foils between external coated foils, wherein the coatings on the double-sided foils face each other and the coatings of the respective external foils, and are pressed against each other (stage 240). In certain embodiments, the external foils may be disposable and/or be used as sacrificial layers.

In certain embodiments, pressing 210 may be carried out rotationally by calendaring and/or linearly, e.g., by linear pressing (stage 242). In certain embodiments, method 200 may further comprise applying heat to at least one of the foils during the pressing (stage 244).

In certain embodiments, method 200 comprises preparing electrodes from at least one of the pressed double-sided coated current collector foils and/or comprises preparing electrodes from at least one of the pressed single-sided coated current collector foils (stage 246).

Certain embodiments comprise anode(s) prepared by electrode-preparation method 200 and/or electrode production system 150; cathode(s) prepared by electrode-preparation method 200 and/or electrode production system 150; and/or lithium ion cell(s) comprising anode(s) and/or cathode(s) prepared by electrode-preparation method 200 and/or electrode production system 150.

Method 200 may comprise consecutively, depositing a cell separator slurry on a second sacrificial film to form a cell separator thereupon (stage 250), attaching (e.g., laminating) the electrode (which is attached to the current collector film) onto the formed cell separator, to yield a second stack (stage 260), and configuring a binding strength of the cell separator to the electrode to be higher than a binding strength of the cell separator to the second sacrificial film (stage 270), e.g., by application of coatings and/or adhesives as disclosed above to any of the cell separator, the second sacrificial film and/or the electrode (stage 252). For example, the second sacrificial film may be coated, prior to the depositing of the cell separator, with a coating having a lower binding strength to the cell separator than the binding strength of the cell separator to the electrode. Method 200 may further comprise applying at least a pressure on the second stack to carry out lamination (and possibly the delamination) (stage 282), e.g., by pressing or calendaring, optionally also applying heat to carry out lamination to enhance the binding strength of the cell separator to the electrode. In certain embodiments, method 200 further comprises Pretreating at least one side of the separator (stage 255). Method 200 may further comprise delaminating the second sacrificial film from the separator while maintaining the attachments of the separator to the electrode and of the electrode to the current collector film (stage 280).

Method 200 may optionally further comprise applying at least a pressure on the second stack produced after delamination stage 280 e.g., by pressing or calendaring, optionally also applying heat and configuring the applied pressure (and optionally heat) to enhance the binding strength of the cell separator to the electrode (stage 284).

Method 200 may further comprise using the electrode as at least one of an anode and a cathode in a cell (stage 290), possibly completing at least part of the cell assembly. In certain embodiments, the cell separator may be attached by method 200 to either anode or cathode, and possibly consecutive attaching may be configured to yield a third stack of anode, cell separator and cathode.

In any of the disclosed embodiments, method 200 may further comprise treating any one of the attached surfaces (105) to enhance adhesion and improve the integration of the respective layer and provide more uniform and compact cell structures, resulting in improved electrolyte wetting, cell conductivity (e.g., reduce ESR—equivalent series resistance) and other cell characteristics. For example, electrode surfaces may be pretreated prior to attachments (see e.g., stage 219) and/or separator surfaces may be pretreated prior to attachments (see e.g., stage 255). Surface treatment 105, such as by plasma, may be configured to affect only the surface and not deteriorating the bulk properties of the treated layer, and may additionally improve wetting and ionic conductivity of the treated surface. In case of the separator, surface treatment 105 may be configured to create oxygen termination of surface molecules such as carboxylates, hydroxyls, etc. which may react electrostatically with oxides exposed on the surface of the electrode(s) under pressure, when pressed against each other.

In certain embodiments, disclosed methods, stacks and electrochemical cells implementing any of surface-treated separators, layer transferring using sacrificial films and/or face-to-face calendaring of the electrode material may be combined and integrated to yield flexible and durable electrode stacks.

Electrode-preparation methods and systems are provided, in which coated foils, e.g., having dried electrode slurry layers on one or both sides of current collector films, are pressed against each other, with coating layers on the films facing each other and pressing each other. Particularly in lithium ion battery anodes made of metalloid anode material particles, the hardness of the particles may provide more efficient pressing when pressed against each other, than when pressed by an external calendar—leading to thinner, smother and more controllably porous electrodes and higher throughput. Two or more double-sided coated current collector foils may be pressed between external (possibly sacrificial) coated foils, with the coatings on the double-sided foils face each other and the coatings of the respective external foils. Electrodes (e.g., anodes, cathodes) may be prepared from the pressed double-sided coated current collector foils.

FIG. 8 is a high-level schematic illustration of electrode foils 110 and pressing and/or calendaring unit 170 in electrode production system 150, according to some embodiments of the invention. Coated current collector foils 101, composed of a current collector film 104 and coating 102 on at least one side of film 104, are pressed against each other to yield electrode foils 110 with smooth surfaces 112. Electrode(s) 95 may then be processed from electrode foils 110. FIG. 9 is a high-level schematic illustration of prior art electrode production 50. In the prior art, slurry 62 is applied to a film 60 and pressed by calendar 55 into electrode 65. In the prior art, at least one of calendars 55 presses the surface of the coating directly. The inventors have found out and show below, that applying pressure by one coating 102 facing another coating 102 results in smother coatings 112 (with respect to a surface roughness 67 of prior art electrode foils 65, see e.g., FIGS. 17A, 17B), with improved quality and better operation as electrodes in lithium ion batteries. It is noted that spaces between foils and system elements are shown merely for illustration and clarity purposes, as foils pressed against each other contact each other. Any of the embodiments may be implemented by pressing or calendaring unit 170, possibly as part of various embodiments of electrode production system 150.

Electrode production systems 150 comprise two pressure-applying apparatuses 115 (e.g., rotational calendars, linear presses, etc.) facing each other and configured to receive and press, against each other, at least two coated current collector foils 101 having, e.g., dried electrode slurry layers 102 as coatings on current collector films 104. It is noted that dried electrode slurry coating 102 of current collector films 104 may be configured to optimize mechanical parameters of the process and the resulting characteristics of produced electrode foils 110.

In contrast to prior art, pressure-applying apparatuses 115 apply pressure indirectly to coatings 102, as pressure-applying apparatuses 115 press directly films 104 and not slurry layers 102. The actual forces applied onto coatings 102, such as a longitudinal force 125 and a perpendicular force 120 illustrated schematically in FIG. 8, are applied upon contact of coating layer 102 with the other coating layer 102, while neither coating layer 102 contacts pressure-applying apparatuses 115.

The inventors have found out that avoiding direct contact of pressure-applying apparatuses 115 with coatings 102, and moreover, the interlayer force application, contribute to forming thinner, smoother and possibly more uniform electrodes foils 110. The porosity of electrodes foils 110 may be better controlled by the disclosed processes as well. Finally, the throughput of electrode production system 150 of FIG. 8 may be double with respect to prior art electrode production 80 illustrated in FIG. 9.

Figure 10:
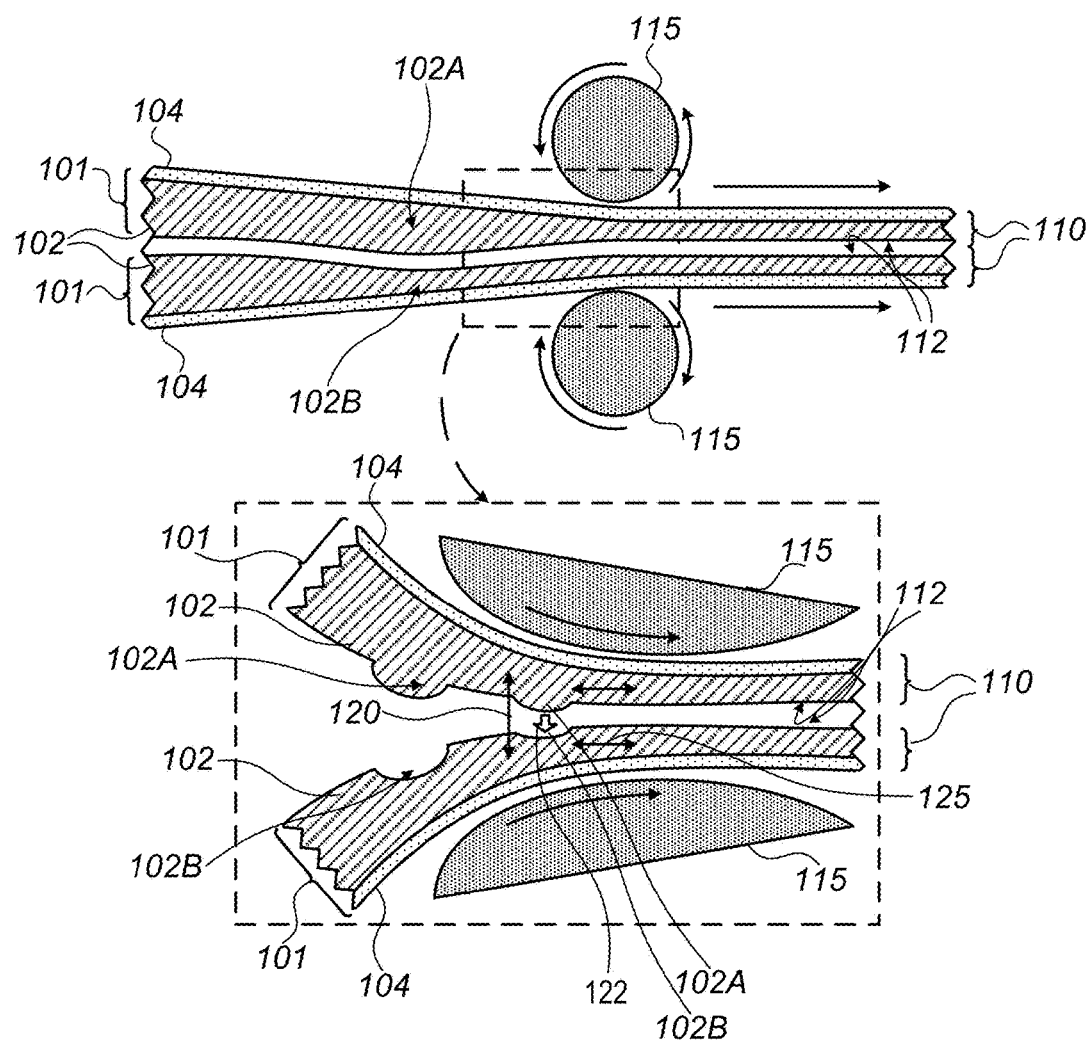
FIG. 10 is a high-level schematic illustration of electrode production system, according to some embodiments of the invention.

FIG. 10 is a high-level schematic illustration of electrode production system 150, according to some embodiments of the invention. In certain embodiments, the inventors have found out that mass transfer 122 may occur as result of the disclosed pressing, e.g., due to application of forces 120, 125 between coating layers 102. In particular, the inventors have found out that mass transfer 122 may contribute to evening out protrusions 102A and/or cavities 102B of coatings 102, e.g., by mass transfer 122 from the former to the latter as well as by the application of horizontal and vertical evening forces 125, 120, respectively. In particular, hard anode material particles as disclosed above may be moved by forces 120, 125 to yield smoother electrode foils 110, with evened-out surfaces. Adherence of moved coating mass (e.g., dried electrode slurry mass) during the pressing may be achieved by interaction of material in coating layers 102 such as anode material particles, binder material, polymer material, conductive additives, etc., as well as by the pressing itself through pressure-applying apparatuses 115 and resulting vertical and horizontal forces 120, 125.

Figure 11A:
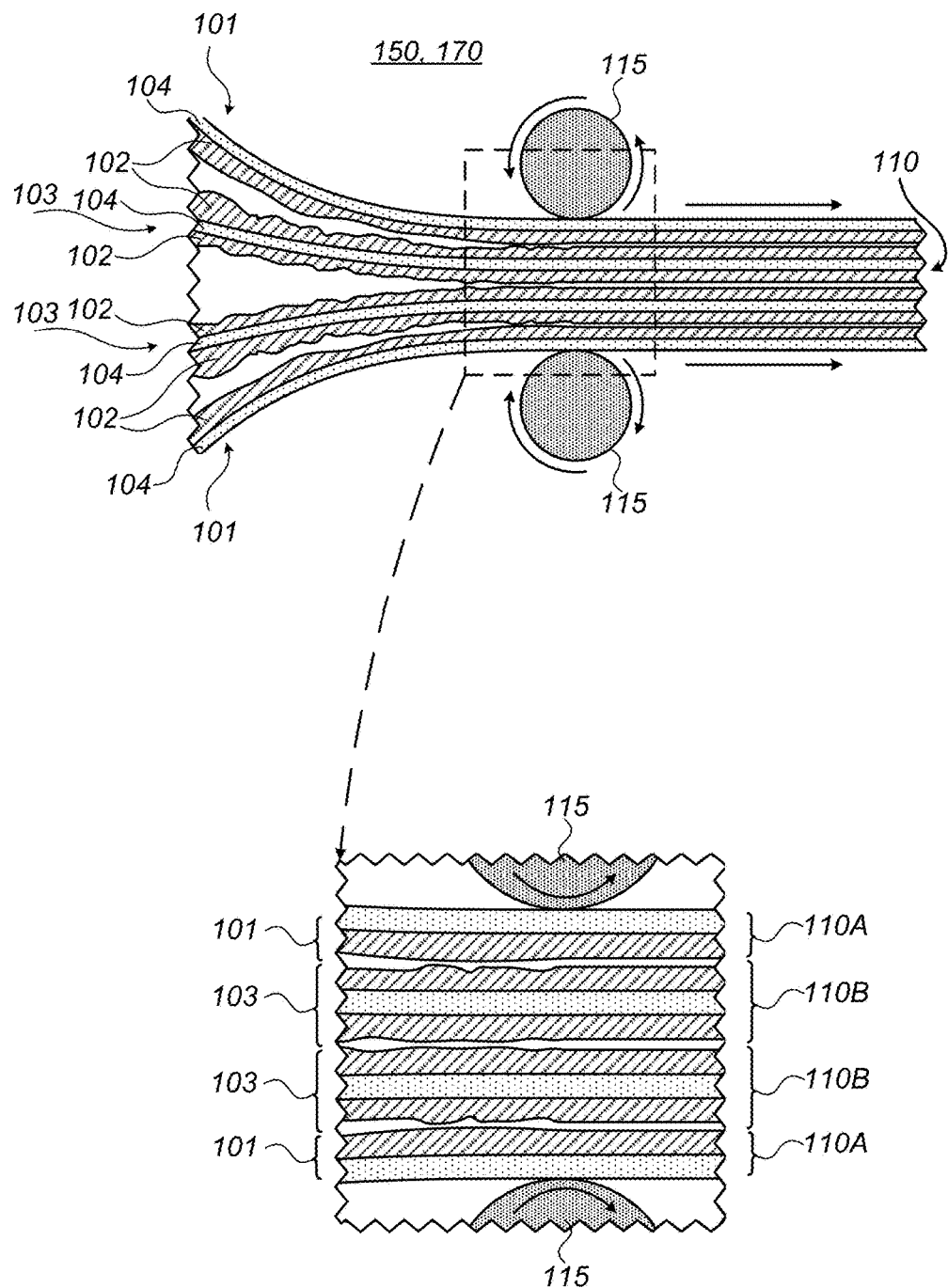
FIGS. 11A and 11B are high-level schematic illustrations of electrode production systems, according to some embodiments of the invention
Figure 11B:
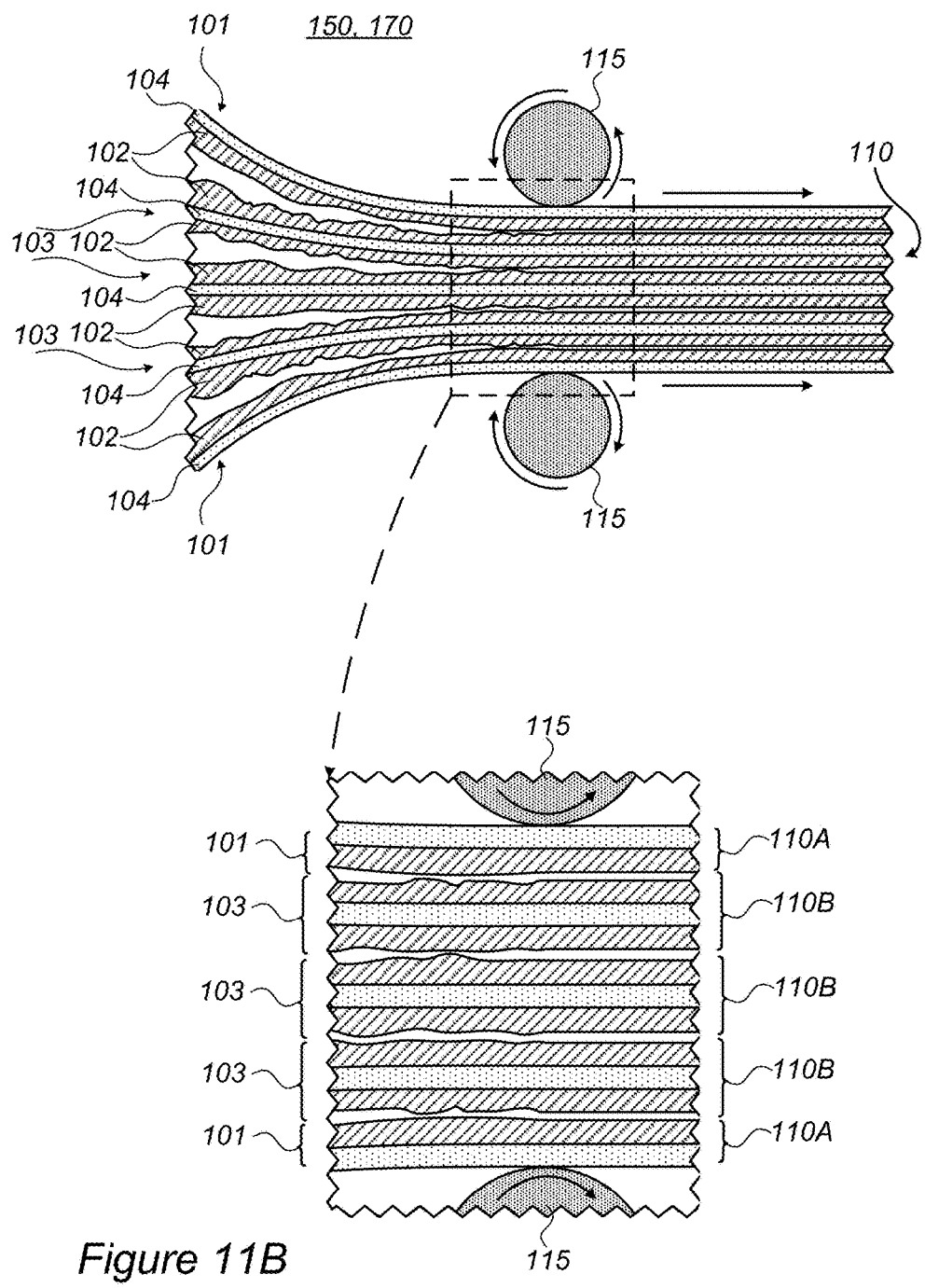

FIGS. 11A and 11B are high-level schematic illustrations of electrode production systems 150, according to some embodiments of the invention. In certain embodiments, at least two double-sided coated current collector foils 103 (each comprising current collector films 104 and coatings 102 on both sides thereof) may be pressed between external coated foils 101 (each comprising films 104 and coatings 102 on one side thereof). Coatings 102 on double-sided foils 103 face each other and coatings 102 of respective external foils 101, and are pressed against each other. The pressing by pressure-applying apparatuses 115 forms electrode foils 110A, 110B from coated foils 101, 103, respectively.

In certain embodiments, electrode production system 150 may be configured to handle one (FIG. 14), two (FIG. 17A), three (FIG. 17B), or more double-sided coated current collector foils 103 and press foils 110A therefrom. In certain embodiments, multiple one-sided foils 101 and/or double-sided foils 103 may be pressed simultaneously, with one or more pairs of coating layers 102 pressed against each other therebetween.

Any of foils 110A, 110B, pressed from foils 101, 103, may be used to prepare electrodes (e.g., anodes, cathodes) by further processing (e.g., cutting and packaging). It is noted that any one of foils 101, 103 may be disposable and used as a sacrificial film in the process. In particular, one-sided foils 101 may be used as disposable or reusable sacrificial films.

FIGS. 12-16 are high-level schematic illustrations of electrode production systems 150, according to some embodiments of the invention. Systems 150 are shown schematically as comprising spools and rollers 106 for handling multiple foils 101, 103, 110 to provide industrial production processes using pressure-applying apparatuses 115 to implements disclosed embodiments. FIGS. 12-16 illustrate schematically, in a non-limiting manner, various production embodiments. It is noted that spaces between foils and system elements are shown merely for illustration and clarity purposes, as foils pressed against each other contact each other. It is further noted that in any of the disclosed embodiments, heat may be applied during the pressing of coated current collector foils 101, 103 against each other, by any of several means (e.g., direct heat, convective heat, radiative heat, etc.). Moreover, it is noted that that in any of the disclosed embodiments, process parameters such as thickness of the films and coatings, dimensions and parameters of pressure-applying apparatuses 115, operation speed and other parameters of spools and rollers 106, characteristics of heat application etc. may be adjusted according to specified requirements.

Figure 12:
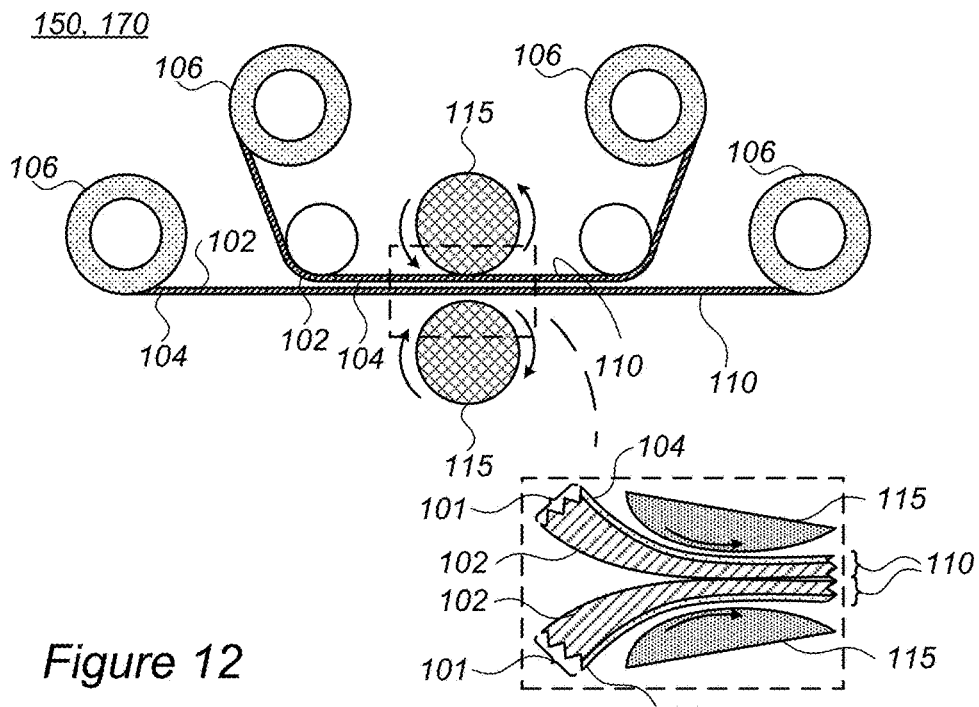
FIGS. 12-16 are high-level schematic illustrations of electrode production systems, according to some embodiments of the invention.
Figure 13:
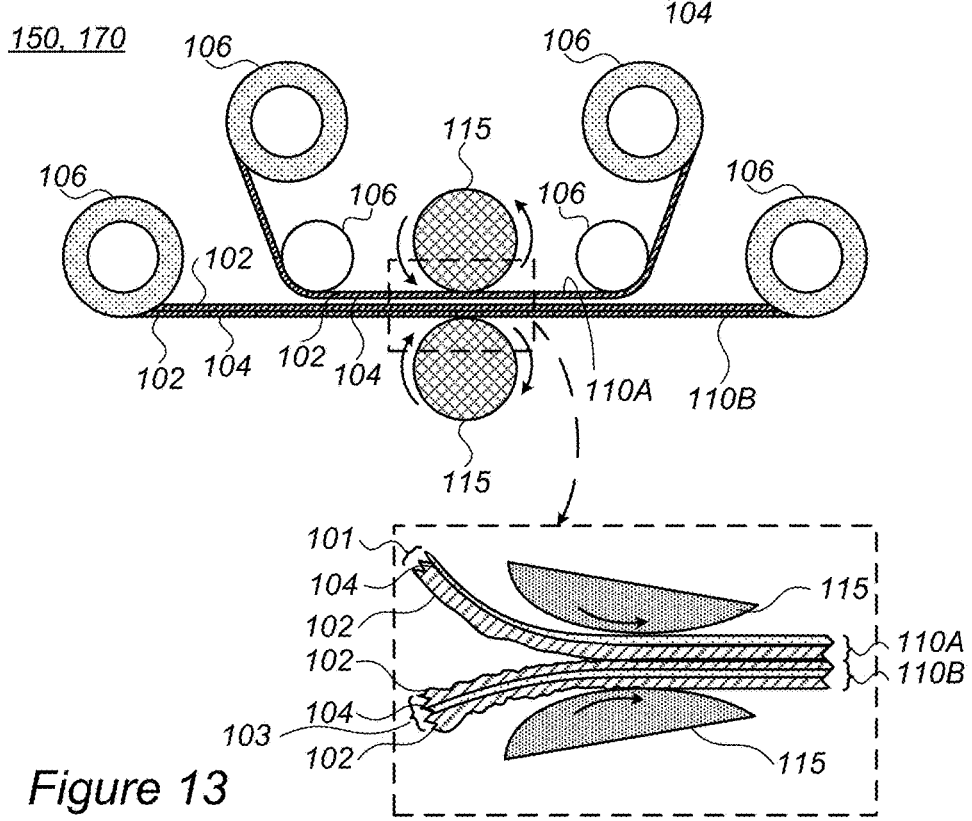

FIG. 12 illustrates schematically calendaring two one-sided foils 101 with their coatings 102 facing each other, similarly to embodiments illustrated schematically in FIGS. 8 and 10. FIG. 13 illustrates schematically calendaring one-sided foil 101 and double-sided foil 103 (having coatings 102 on both sides of film 104) with coating 102 of foil 101 facing one of coatings 102 of double-sided foil 103 and pressed against it. In certain embodiments, one-sided foil 101 or double-sided foil 103 may be sacrificial foils. In certain embodiments, double-sided foil 103 may be further processed with respect to coating 102 facing pressure-applying apparatuses 115, possibly using another one-sided foil 101, or coating 102 facing pressure-applying apparatuses 115 may be left without further pressing. Respective electrode foils 110, 110A, 110B may be formed by the disclosed embodiments of the pressing or calendaring.

Figure 14:
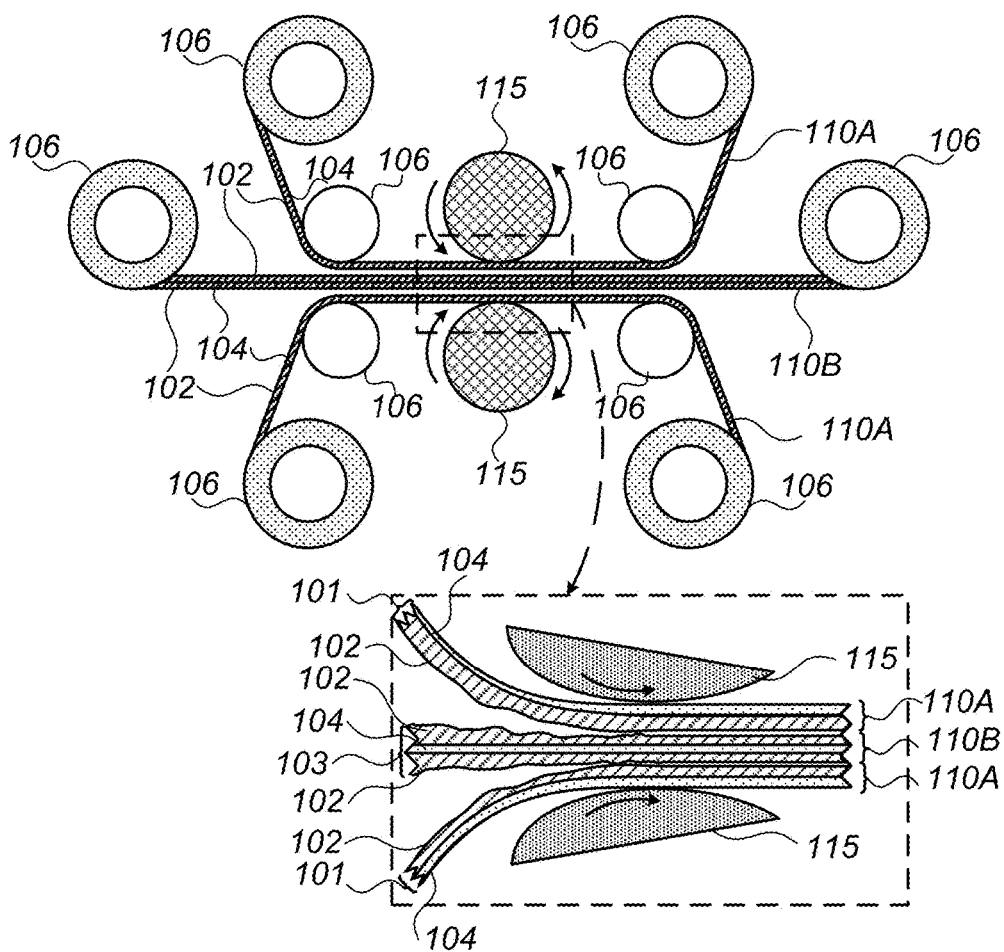

FIG. 14 illustrates schematically calendaring two-sided foil 103 (having coatings 102 on both sides of film 104) between two one-sided foils 101 (having coatings 102 on the sides of film 104 that face coating 102 of two-sided foil 103). Respective electrode foils 110A, 110B may be formed by the disclosed embodiments of the pressing or calendaring.

Figure 15:
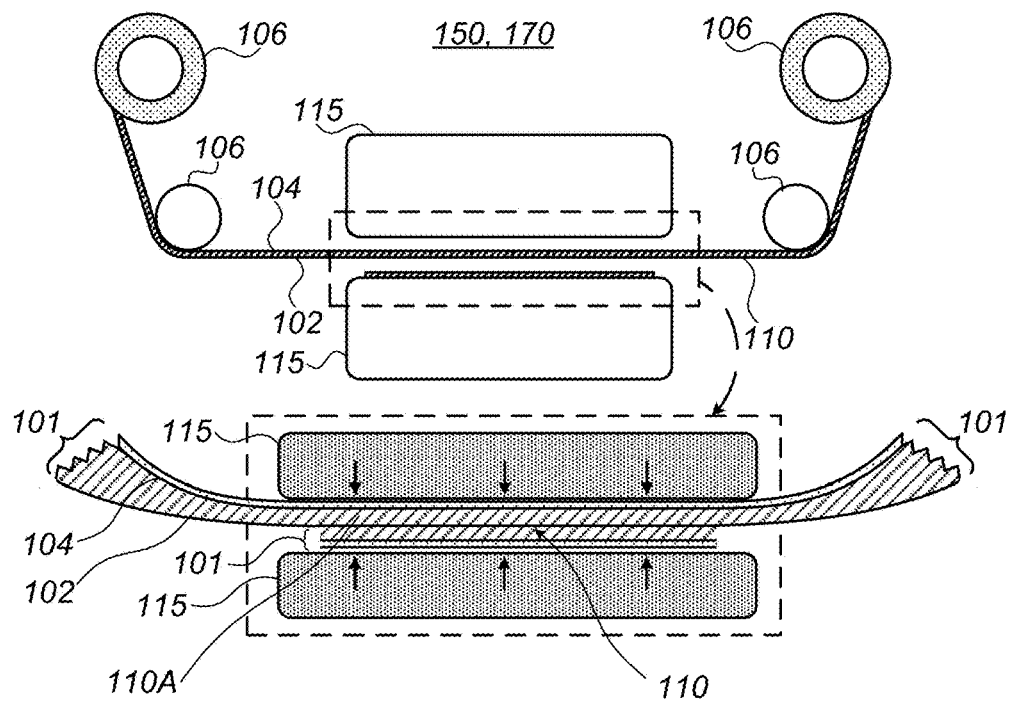
Figure 16:
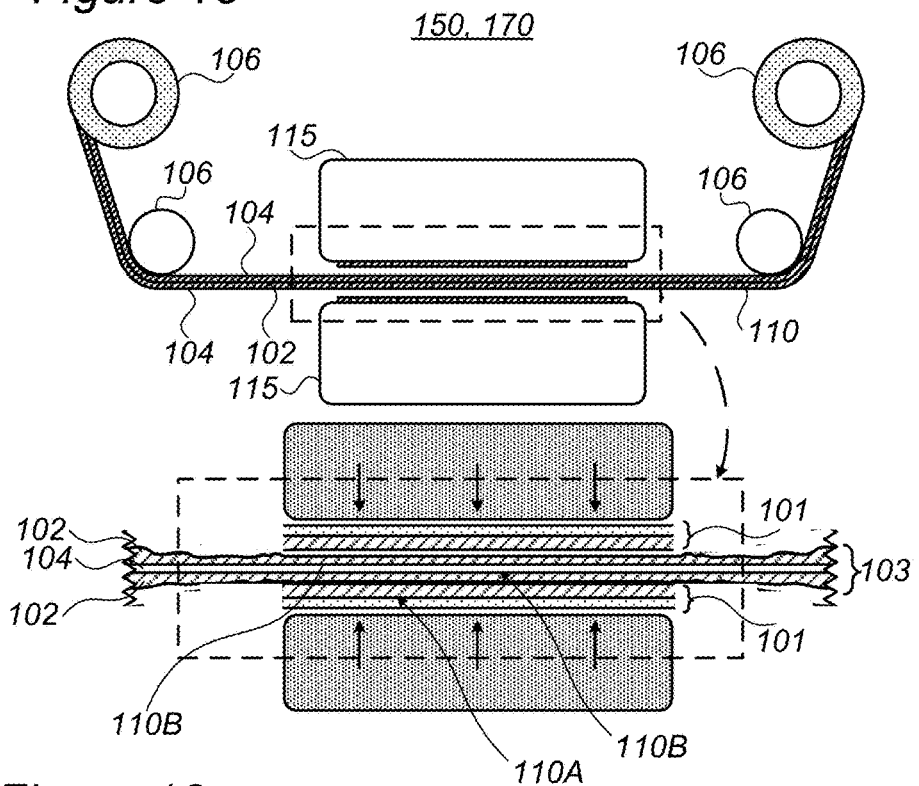

FIGS. 15 and 16 illustrate schematically the use of linearly operating presses 115 as pressure-applying apparatuses 115, applicable in systems 150 in place of, or in addition to, rotationally operating calendars 115 illustrated e.g., in FIGS. 12-14. One-sided foils 101 (having coating 102 on one side of film 104) and/or two-sided foil 103 (having coatings 102 on both sides of film 104) may be pressed between external one or two one-sided foils 101 (or possibly one or two two-sided foils 103, see e.g., FIG. 13), which may be disposable or reusable as sacrificial layers. For example, FIG. 15 illustrates schematically using one-sided foil 101 as sacrificial layer (bottom layer) when pressing another one-sided foil 101 (top layer), while FIG. 16 illustrates schematically using two one-sided foils 101 as sacrificial layers when pressing one two-sided foil 103.

It is noted that in FIGS. 8 and 11-16, spaces between layers 102 that are pressed against each other and spaces between pressure-applying apparatuses 115 and films 104— are shown only for clarity reasons (cross section shown in exploded view), as clearly the pressing involves contact between the respective structures.

In certain embodiments, systems 150 may comprise members configured to surface-treat at least one separator film and to attach the surface-treated separator to at least one of the coated foils, which may be coated e.g., with electrode slurry, and attached to the separator(s) at their treated surface(s), as illustrated e.g., in FIGS. 1A, 1B.

FIGS. 17A and 18A illustrate examples of cross-sections of prior art electrode foils 65, while FIGS. 17B and 18B illustrate examples of cross-sections of electrode foils 110 prepared according to some embodiments of the invention. The illustrated examples were imaged by scanning electron microscope (SEM).

As an example for the improved quality of one-sided electrode foils 110, FIG. 17B illustrates a cross-section of one-sided electrode foil 110 prepared by pressure-applying apparatuses 115 as explained above, according to some embodiments of the invention, with respect to FIG. 17A illustrating a cross-section of prior art one-sided electrode foil 65. Electrode foil 110 is clearly flatter, thinner and has smother surface 112 (with respect to prior art surface 67) and may have a more uniform internal structure with better controllable porosity than prior art electrode foils 65.

As another example for the improved quality of double-sided electrode foils 110, FIG. 18B illustrates a cross-section of double-sided electrode foil 110 prepared by pressure-applying apparatuses 115 as explained above, according to some embodiments of the invention, with respect to FIG. 18A illustrating a cross-section of prior art double-sided electrode foil 65. Electrode foil 110 is clearly flatter, thinner and has smother surface 112 (with respect to prior art surface 67) and may have a more uniform internal structure with better controllable porosity than prior art electrode foils 65.

FIGS. 19A-19C are examples for disclosed separators 75 and stacks 108 prepared according to disclosed methods 200, compared to prior art separators and stacks. FIG. 19A is an image of laminate stack 108, according to some embodiments of the invention. Laminate stack 108 is thin and uniform, having good and stable attachment of separator 75 and electrodes 95. FIG. 19B is a comparison of laminated stack 108 with prior art stack 68 in which cathode foil 68 is not attached well to untreated separator 61. FIG. 19C demonstrates the better wettability of surface-treated separator 75 by the electrolyte, measured by the sessile drop method, according to some embodiments of the invention, with respect to untreated separator 61. The better wettability indicates the surface activation of separator 75 which enables it to attach to electrodes 95 as disclosed below, as well as improving its wettability towards the electrolyte.

In the non-limiting illustrated examples of FIGS. 19A-19C, a polyethylene membrane film having a monolayer architecture with a thickness of 12 microns and about 41% porosity was used as the separator, the anode was based on Ge anode material, coated on a Cu film as current collector to form a layer ca. 20 μm thick. The cathode was based on NCA coated on Al film and having a thickness of about 50 μm. The separator membrane and electrodes were treated in an Ar or dry air microwave plasma applicator under different conditions, e.g., 18W applied for 1-3 minutes. Right after plasma treatment, the separator and electrodes were laminated under dry air environment (dew point −40° C.). Cold lamination was performed using a two-roll calendar tool at temperatures below 55° C., and resulted in a strong bond between the electrodes and separator, as illustrated in FIG. 19A while untreated separator films, under the same stacking and process conditions, did not yield stable attachment to the electrodes (FIG. 19B). No changes in the stacking (bonding) of the laminated electrodes and separator after plasma treatment were observed after ten days of storage under air environment. The laminated and non-laminated electrodes and separators were closed to soft pack pouch cells with EMC-based electrolyte. The laminated cells showed increased cycle life under high charging rates, as illustrated below (see FIGS. 22A-22C).

It is noted that the plasma treatment may be carried out under different conditions, which may be adjusted and optimized with respect to each other and according to the materials used in the batteries, e.g., the power and duration of surface treatment 105 may vary in the ranges 10-600 W power for 1000-10 seconds, respectively (the higher the applied power is, the shorter is the duration of the surface treatment).

FIG. 19D is a SEM image of prior art double sided electrode (anode) produced not using the disclosed lamination process, and exhibiting rough and non-uniform anode surfaces.

Figures 20A, 20B:
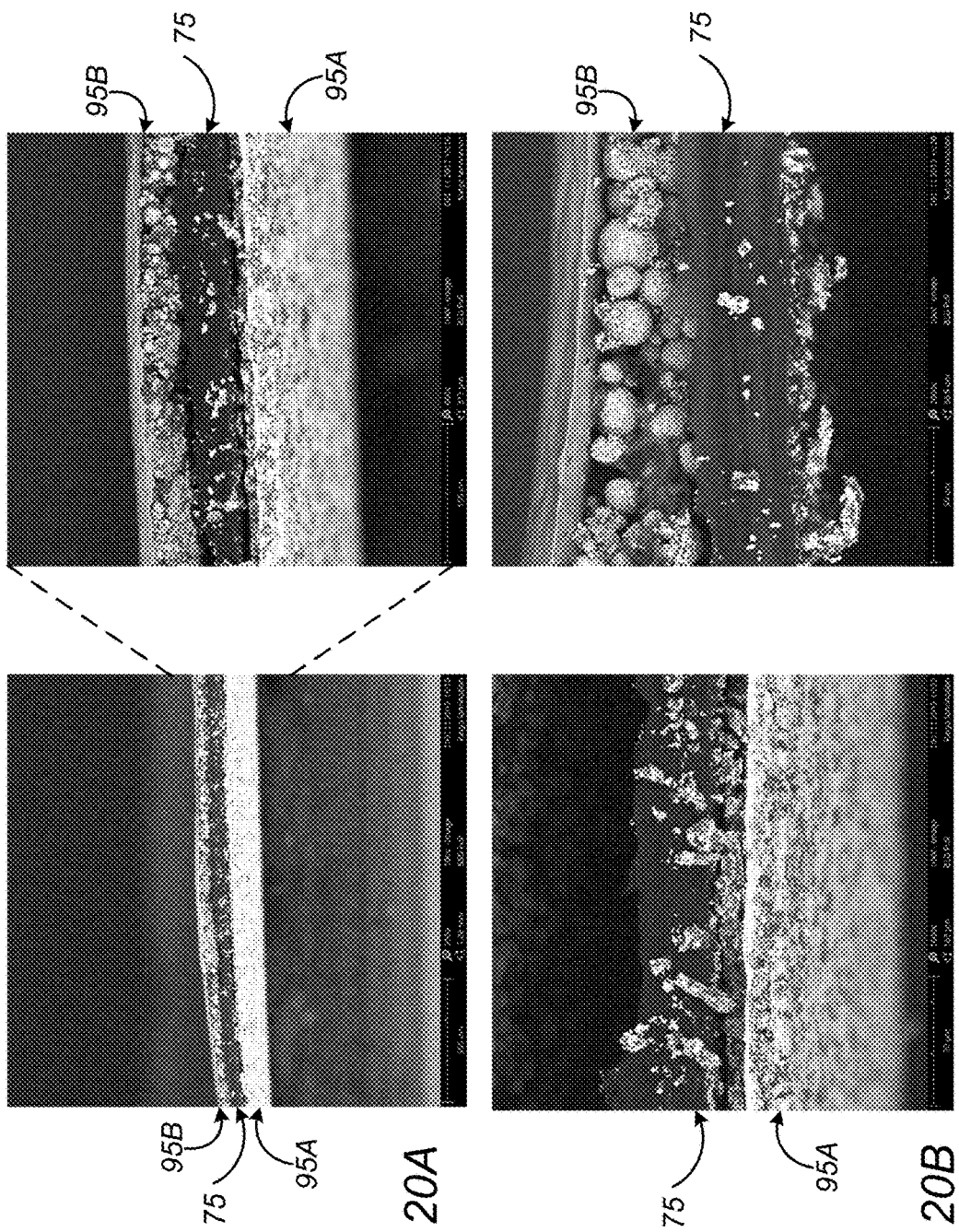
FIGS. 20A and 20B are SEM images of prepared laminated separators and electrodes, according to some embodiments of the invention.

FIGS. 20A and 20B are SEM images of prepared laminated separators 75 and electrodes 95, according to some embodiments of the invention. FIG. 20A illustrates laminated cathode 95B, separator 75 and anode 95A, and FIG. 20B illustrates pairs of laminated anode 95A and separator 75, and cathode 95B separator 75—all of which indicating the production quality of laminated stacks 108. As illustrated in the SEM images, electrodes 95 are uniform and thin, and are uniformly and securely attached to separator 75.

FIG. 21 provides SEM images of the surfaces of anode 95A, cathode 95B and separator 75, respectively, before and after surface treatment 105 by plasma, in a non-limiting example, according to some embodiments of the invention. No surface damage or other surface morphology changes were observed on the separator and electrodes after the plasma treatment. Energy-dispersive X-ray spectroscopy showed oxygen termination on the surface such as carboxylates, hydroxyls, etc. as disclosed above, serving as binding sites 105A on separator 75 and/or surface elements 105B on electrodes 95 during the lamination process, to yield improved laminated stacks 108.

FIGS. 22A-22C illustrate prior art cell assembly with its cycling characteristics and cycling characteristics of laminated stacks 108 illustrated in FIG. 19A, in a non-limiting example, according to some embodiments of the invention. Laminated stacks 108 were prepared by laminating an anode, a separator, and a cathode using the calendaring procedure after plasma surface pretreatment and assembling the stack into a soft package pouch cell with EMC-based electrolyte. The prior art stack illustrated in FIG. 22A was prepared without plasma pretreatment, attaching the anode, separator, and cathode without plasma pretreatment, by sticking the electrodes and separator together with a glue strip during cell assembly. An additional prior art stack assembly was carried out without plasma pretreatment and without additional attaching of the electrodes and separator, which resulted in cells with very high internal resistance onto which fast charging (at 8 C) was not applicable at all. In the prior art cells, the same EMC-based electrolyte was used. All cells were run at a standard procedure of formation and cycled at 8 C/1 C charging/discharging rates. FIGS. 22B and 22C illustrate the cycling characteristics of the prior art stack of FIG. 22A and of laminated stack 108 of FIG. 19A, respectively. The cycling characteristics comprise the charged and discharged capacities, Columbic efficiency (cycling efficiency) and capacity retention form the initial value. Similar behavior of two cells is observed, clearly indicating the efficiency and compatibility of surface treatment and cold lamination described above, and provide improved cycling efficiency and capacity retention with respect to the prior art cells.

Disclosed electrode foils 110 may be used as anodes in energy storage devices, such as lithium ion batteries. The electrode slurry, and consequently coatings 102 and electrode foils 110, may comprise anode material in form of anode material particles (e.g., having a diameter of 100-500 nm), which may comprise e.g., particles of metalloids such as silicon, germanium and/or tin, and/or possibly particles of aluminum, lead and/or zinc, and may further include various particle surface elements (e.g., having a diameter of 10-50 nm or less) such nanoparticles (e.g., $B_4C$, WC, VC, TiN), borate and/or phosphate salt(s) and/or nanocrystals and possibly polymer coatings (e.g., conductive polymers, lithium polymers). The electrode slurry may be prepared by ball milling processes and may further comprise additive(s) such as binder(s), plasticizer(s) and/or conductive filler(s). Drying of slurry spread on film 104 to form dried slurry layer(s) 102 may be carried out may be carried out with or without further intervention, the former possibly involving controlling environmental conditions (e.g., temperature, humidity), applying direct heat or air flow and/or controlling evaporation parameters.

Without being bound by theory, the inventors suggest that the thinner and more uniform electrodes 110 may be a result of forces 120, 125 acting between the anode material particles in each electrode 110 and between electrodes 110, respectively, instead of between electrode 65 and calendar 55 as in the prior art. For example, the direct application of forces among anode material particles in dried slurry layers 102, being pressed against each other, may yield a smoother surface of electrodes 110 by evening out the surface more efficiently than by pressing against the large external calendar 55 of the prior art (e.g., larger, or more effectively applied forces 125). Moreover, as in some embodiments, the anode material particles have a higher strength than the material of prior art calendar 55 (e.g., Si/Ge anode material particles with $B_4C$/WC nanoparticles or coatings versus aluminum of prior art calendar 55) larger forces may be applied in the disclosed invention than in the prior art, possibly leading to more efficient smoothing (e.g., larger forces 120). In certain embodiments, the similar composition of dried slurry layers 102 being pressed against each other—may yield a smoother and/or more uniform product electrode 110 than resulting from prior art asymmetry between pressed film 60 and pressing calendar 55, which are typically made of different materials and have different structural parameters and characteristics.

Advantageously, disclosed method 200 and systems 150, in any of their embodiments and/or combinations, may provide improved electrodes, which are more uniform (in bulk and/or on their surface) and operate better in lithium ion cells. For example, electrode foils 110 may have fewer and/or less sharp protrusions 102A, (reducing the probability for charge accumulation at the protrusions), have a more uniform thickness, reducing the expansion of the electrode during the charging cycles. Moreover, the better adhesion and uniformity achieved through disclosed methods 200 and systems 150 also reduce the resistance of the electrode and therefore improve the cell's performance.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
surface treating at least one cell separator prior to attachment to at least one electrode, wherein the surface treating is configured to form binding sites on the at least one cell separator, and
attaching the at least one cell separator to the at least one electrode by cold press lamination, wherein the created binding sites are configured to stabilize the cold press lamination electrostatically.

2. The method of claim 1, further comprising applying the surface treatment to both sides of the at least one cell separator and wherein the at least one electrode comprises, for each of the at least one cell separator, an anode attached to one side of the separator and a cathode attached to another side of the separator.

3. The method of claim 2, wherein both anode and cathode are attached to the separator simultaneously.

4. The method of claim 2, further comprising assembling a cell stack by performing the attachment to a plurality of cell separator and a corresponding plurality of alternating anodes and cathodes.

5. A flexible battery comprising the assembled cell stack prepared by the method of claim 4.

6. The method of claim 1, wherein the cold press lamination is carried out below 60° C. and/or below 40 and/or at room temperatures.

7. The method of claim 1, wherein the surface treatment is carried out by any of plasma treatment, corona treatment, ultraviolet radiation.

8. The method of claim 1, wherein the surface treatment is carried out by depositing an ionic-conductive surface layer to form the binding sites.

9. The method of claim 1, wherein the at least one cell separator is polymeric and the surface treatment comprises depositing a ceramic surface layer onto the polymeric at least one cell separator.

10. The method of claim 1, wherein the at least one electrode comprises attached corresponding at least one current collector film.

11. The method of claim 10, wherein the at least one electrode is attached to the corresponding at least one current collector film by a conductive adhesive.

12. The method of claim 1, wherein the attaching is carried out using a sacrificial film onto which at least one of: at least one cell separator and the at least one electrode, are deposited as corresponding slurry.

13. The method of claim 1, further comprising pressing the at least one electrode face-to-face against another electrode prior to the attaching of the at least one cell separator.

14. The method of claim 1, wherein the attaching is carried out by at least one of: single sheet stacking, winding, Z-folding with single electrodes and Z-folding with electrode rolls.

15. The method of claim 1, further comprising:
prior to the surface treatment, depositing a cell separator slurry on a sacrificial film to form a cell separator thereupon, and
following the surface treatment:
attaching the formed cell separator onto the at least one electrode attached to at least one corresponding current collector film, to yield a stack, wherein a binding strength of the cell separator to the electrode is higher than a binding strength of the cell separator to the sacrificial film, and
delaminating the sacrificial film from the separator while maintaining the attachments of the separator to the electrode and of the electrode to the current collector film.

16. The method of claim 15, further comprising preparing the at least one electrode attached to the at least one corresponding current collector film by:
depositing an electrode slurry on a sacrificial film to form the at least one electrode thereupon, wherein the electrode slurry comprises a first solvent,
attaching a current collector film, which is produced using a second solvent, onto the formed electrode, to yield a stack, wherein a binding strength of the electrode to the current collector film is higher than a binding strength of the electrode to the sacrificial film, and
delaminating the sacrificial film from the electrode while maintaining the attachment of the electrode to the current collector film.

17. The method of claim 16, further comprising:
pressing at least two double-sided coated current collector foils between external coated foils, wherein the coatings on the double-sided foils comprise the electrode slurry and face each other and the coatings of the respective external foils, and are pressed against each other, and
preparing the electrodes from at least one of the pressed double-sided coated current collector foils.

18. The method of claim 16, further comprising preparing the at least one electrode attached to the at least one corresponding current collector film by:
pressing at least two double-sided coated current collector foils between external coated foils, wherein the coatings on the double-sided foils comprise electrode slurry and face each other and the coatings of the respective external foils, and are pressed against each other, and
preparing electrodes from at least one of the pressed double-sided coated current collector foils.

19. A cell stack assembly system comprising:
a surface treatment module configured to treat both surfaces of each of a plurality of cell separators, to form binding sites thereupon,
a stacking module configured to stack a plurality of alternating anodes and cathodes between the cell separators, and
a cold-press lamination module configured to cold-press the stack, wherein the formed binding sites are configured to stabilize the cold-pressed stack electrostatically.

20. The cell stack assembly system of claim 19, further comprising at least one of:
a layer transfer module configured to prepare the at least one electrode attached to at least one corresponding current collector film by depositing an electrode slurry on a sacrificial film to form the at least one electrode thereupon, wherein the electrode slurry comprises a first solvent; attaching a current collector film, which is produced using a second solvent, onto the formed electrode, wherein a binding strength of the electrode to the current collector film is higher than a binding strength of the electrode to the sacrificial film; and delaminating the sacrificial film from the electrode while maintaining the attachment of the electrode to the current collector film, and
a calendaring unit comprising two pressure-applying apparatuses facing each other and configured to receive and press, against each other, at least two double-sided coated current collector foils between external coated foils, wherein the coatings on the double-sided foils face each other and the coatings of the respective external foils, and are pressed against each other, and wherein the two pressure-applying apparatuses are configured to apply pressure on the external coated foils.

21. A cell stack for lithium ion batteries, the cell stack comprising a plurality of anodes and cathodes, separated by a plurality of cell separators,
wherein at least one of the anodes, the cathodes and the cell separators are surface treated to form binding sites upon surfaces thereof, and
wherein the anodes, the cathodes and the cell separators are attached by cold press lamination, electrostatically stabilized by the created binding sites.

22. A method comprising:
surface treating, prior to stack lamination, at least one cell separator and/or at least one electrode, wherein the surface treating is configured to form binding sites on the at least one cell separator and/or at least one electrode, respectively, and
laminating, by cold press lamination, a stack of multiple alternating separators and electrodes, comprising the at least one separator and the at least one electrode, at least one of which being surface treated by said surface treating,
wherein the created binding sites are configured to stabilize the cold press lamination electrostatically.

23. The method of claim 22, further comprising attaching the alternating separators and electrodes by at least one of: single sheet stacking, winding, Z-folding with single electrodes and Z-folding with electrode rolls.

24. The method of claim 22, wherein the surface treatment is carried out by any of plasma treatment, corona treatment, ultraviolet radiation.

25. The method of claim 22, wherein the stack of multiple alternating separators and electrodes comprises at least one of: a single separator and a single electrode, a single separator and two electrodes on either side thereof, a single electrode and two separators on either side thereof, an alternating plurality of separators and plurality of electrodes.

26. The method of claim 22, wherein the stack of multiple alternating separators and electrodes comprises a single separator foil and two electrodes foils which are laminated to on either side of the separator foil by a roll to roll process.

* * * * *